(12) United States Patent
Chapel et al.

(10) Patent No.: US 10,698,469 B2
(45) Date of Patent: Jun. 30, 2020

(54) PREMISES POWER USAGE MONITORING SYSTEM

(71) Applicant: Zonit Structured Solutions, LLC, Boulder, CO (US)

(72) Inventors: Steve Chapel, Iliff, CO (US); William Pachoud, Boulder, CO (US)

(73) Assignee: Zonit Structured Solutions, LLC, Boulder, CO (US)

( * ) Notice: Subject to any disclaimer, the term of this patent is extended or adjusted under 35 U.S.C. 154(b) by 181 days.

(21) Appl. No.: 15/656,229

(22) Filed: Jul. 21, 2017

(65) Prior Publication Data

US 2018/0041071 A1 Feb. 8, 2018

Related U.S. Application Data

(63) Continuation of application No. 14/717,899, filed on May 20, 2015, now Pat. No. 9,958,925, which is a
(Continued)

(51) Int. Cl.
*G06F 1/3209* (2019.01)
*G06F 1/3203* (2019.01)
(Continued)

(52) U.S. Cl.
CPC ........... *G06F 1/3209* (2013.01); *G05B 15/02* (2013.01); *G05F 1/66* (2013.01); *G06F 1/28* (2013.01);
(Continued)

(58) Field of Classification Search
CPC .... Y04S 10/522; Y04S 20/221; Y04S 20/222; Y04S 20/227; Y04S 20/228; Y04S 20/32; Y04S 20/322; Y04S 20/327; Y04S 20/34; Y04S 20/40; Y04S 20/46; Y04S 20/52; Y04S 40/146; Y04S 50/10; Y02B 70/3208; Y02B 70/3216; Y02B 70/3225;
(Continued)

(56) References Cited

U.S. PATENT DOCUMENTS 4,174,517 A 11/1979 Mandel
4,215,276 A 7/1980 Janeway
(Continued)

FOREIGN PATENT DOCUMENTS

CN 1052752 A 7/1991

OTHER PUBLICATIONS

Renesas Edge, Home Networking Making Japanese Standards into World Standards, 2005, pp. 1-25, vol. 7, Renesas Technology America, Inc.

*Primary Examiner* — Crystal J Barnes-Bullock
(74) *Attorney, Agent, or Firm* — Davis Graham & Stubbs LLP

(57) ABSTRACT

A control system (300) allows recognized standard premise electrical outlets, for example NEMA, CEE and BS, among others to be remotely monitored and/or controlled, for example, to intelligently execute blackouts or brownouts or to otherwise remotely control electrical devices. The system (300) includes a number of smart receptacles (302) that communicate with a local controller (304), e.g., via power lines using the TCP/IP protocol. The local controller (304), in turn, communicates with a remote controller (308) via the internet.

36 Claims, 11 Drawing Sheets

Related U.S. Application Data continuation of application No. 13/763,480, filed on Feb. 8, 2013, now Pat. No. 9,160,168, and a continuation of application No. 13/757,156, filed on Feb. 1, 2013, now abandoned, which is a continuation of application No. 12/569,377, filed on Sep. 29, 2009, now Pat. No. 8,374,729, which is a continuation of application No. 12/531,226, filed as application No. PCT/US2008/057150 on Mar. 14, 2008, now abandoned.

(60) Provisional application No. 60/894,846, filed on Mar. 14, 2007.

(51) Int. Cl.
*H02J 3/14* (2006.01)
*H02J 13/00* (2006.01)
*G05F 1/66* (2006.01)
*H02J 3/00* (2006.01)
*G05B 15/02* (2006.01)
*G06F 1/28* (2006.01)
*G06F 1/3287* (2019.01)
*H01R 13/717* (2006.01)

(52) U.S. Cl.
CPC .......... *G06F 1/3203* (2013.01); *G06F 1/3287* (2013.01); *H02J 3/00* (2013.01); *H02J 3/14* (2013.01); *H02J 13/0082* (2013.01); *H01R 13/7175* (2013.01); *H02J 2310/14* (2020.01); *Y02B 70/3225* (2013.01); *Y02B 70/3266* (2013.01); *Y02B 90/2615* (2013.01); *Y02B 90/2669* (2013.01); *Y02E 10/563* (2013.01); *Y02E 10/763* (2013.01); *Y02E 60/74* (2013.01); *Y04S 10/30* (2013.01); *Y04S 20/222* (2013.01); *Y04S 20/242* (2013.01); *Y04S 40/121* (2013.01); *Y04S 40/128* (2013.01); *Y10T 307/391* (2015.04); *Y10T 307/406* (2015.04); *Y10T 307/469* (2015.04)

(58) Field of Classification Search
CPC .............. Y02B 70/3241; Y02B 70/325; Y02B 70/3266; Y02B 70/343; Y02B 90/241; Y02B 90/242; Y02B 90/244; Y02B 90/245; Y02B 90/248; Y02B 90/2692; G05B 23/02; G05B 23/0267; G01D 4/002; G01D 4/004; G08B 25/06; Y02E 10/563; Y02E 10/763
See application file for complete search history.

(56) References Cited

U.S. PATENT DOCUMENTS

| | | | |
|---|---|---|---|
| 4,395,640 A | 7/1983 | Bone | |
| 4,432,064 A | 2/1984 | Barker et al. | |
| 4,528,457 A | 7/1985 | Keefe et al. | |
| 4,810,199 A | 3/1989 | Kar | |
| 5,097,249 A | 3/1992 | Yamamoto | |
| 5,101,191 A | 3/1992 | MacFadyen et al. | |
| 5,293,028 A | 3/1994 | Payne | |
| 5,525,908 A | 6/1996 | Brownell | |
| 5,696,695 A | 12/1997 | Ehlers et al. | |
| 5,880,677 A | 3/1999 | Lestician | |
| 6,005,476 A | 12/1999 | Valiulis | |
| 6,049,143 A | 4/2000 | Simpson et al. | |
| 6,317,028 B1 | 11/2001 | Valiulis | |
| 6,365,989 B1 | 4/2002 | O'Donnell | |
| 6,429,598 B1 | 8/2002 | Haley | |
| 6,445,087 B1 | 9/2002 | Wang et al. | |
| 6,459,175 B1 | 10/2002 | Potega | |
| 6,487,310 B1 | 11/2002 | Bishop et al. | |
| 6,512,966 B2 | 1/2003 | Lof et al. | |
| 6,611,134 B2 | 8/2003 | Chung | |
| 6,631,309 B2 | 10/2003 | Boies et al. | |
| 6,756,771 B1 | 6/2004 | Ball et al. | |
| 6,828,695 B1 | 12/2004 | Hansen | |
| 6,901,226 B2 | 5/2005 | Claassen | |
| 6,950,010 B2 | 9/2005 | Aisa | |
| 6,985,072 B2 | 1/2006 | Omidi et al. | |
| 7,068,184 B2 | 6/2006 | Yee et al. | |
| 7,123,994 B2 | 10/2006 | Weik et al. | |
| 7,129,822 B2 | 10/2006 | Finan et al. | |
| 7,155,622 B2 | 12/2006 | Mancey et al. | |
| 7,162,521 B2 | 1/2007 | Ewing et al. | |
| 7,167,078 B2 | 1/2007 | Pourchot | |
| 7,188,260 B1 | 3/2007 | Shaffer et al. | |
| 7,221,106 B1 | 5/2007 | Nemir et al. | |
| 7,231,281 B2 | 6/2007 | Costa | |
| 7,256,727 B2 | 8/2007 | Fullerton et al. | |
| 7,276,815 B2 | 10/2007 | Algrain et al. | |
| 7,346,340 B2 | 3/2008 | Purnadi et al. | |
| 7,385,406 B1 | 6/2008 | Blades | |
| 7,489,988 B2 * | 2/2009 | Matsui | H02J 3/14 700/287 |
| 7,504,744 B2 | 3/2009 | Stanford | |
| 7,561,977 B2 * | 7/2009 | Horst | H02J 3/14 700/295 |
| 7,586,420 B2 * | 9/2009 | Fischer | G06F 1/30 340/635 |
| 7,630,186 B2 | 12/2009 | Reynolds et al. | |
| 7,657,763 B2 | 2/2010 | Nelson et al. | |
| 7,681,052 B2 | 3/2010 | Darshan et al. | |
| 7,738,999 B2 * | 6/2010 | Petite | H02J 3/14 700/295 |
| 7,761,555 B1 | 7/2010 | Bishel | |
| 7,915,899 B2 | 3/2011 | Sexton et al. | |
| 7,925,388 B2 * | 4/2011 | Ying | H01H 9/32 337/16 |
| 7,936,546 B2 | 5/2011 | Vorenkamp et al. | |
| 8,000,074 B2 | 8/2011 | Jones et al. | |
| 8,040,235 B2 | 10/2011 | Koga et al. | |
| 8,090,556 B2 * | 1/2012 | Keefe | G05B 23/0267 700/22 |
| 8,315,744 B2 | 11/2012 | Chatterton et al. | |
| 8,401,709 B2 | 3/2013 | Cherian et al. | |
| 8,473,111 B1 * | 6/2013 | Shankar | H02J 3/14 700/293 |
| 8,990,590 B2 * | 3/2015 | Benson | H02J 3/14 700/295 |
| 8,996,188 B2 * | 3/2015 | Frader-Thompson | G01D 4/002 340/12.32 |
| 9,031,874 B2 | 5/2015 | Kremen | |
| 9,282,001 B2 | 3/2016 | Bell et al. | |
| 9,588,534 B2 * | 3/2017 | Chapel | H04L 12/4633 |
| 9,733,286 B2 * | 8/2017 | Chen | G06Q 50/06 |
| 9,823,283 B2 * | 11/2017 | Kabler | G01R 31/2836 |
| 9,881,273 B2 * | 1/2018 | Yang | G06Q 10/0833 |
| 10,050,441 B2 * | 8/2018 | Chapel | G05F 1/66 |
| 10,157,278 B2 * | 12/2018 | Aguayo Gonzalez | G01R 21/00 |
| 2001/0025349 A1 | 9/2001 | Sharood et al. | |
| 2002/0103655 A1 | 8/2002 | Boies et al. | |
| 2004/0095237 A1 | 5/2004 | Chen et al. | |
| 2005/0052185 A1 | 3/2005 | Moore | |
| 2005/0068716 A1 | 3/2005 | Pereira | |
| 2005/0116836 A1 | 6/2005 | Perry et al. | |
| 2005/0278075 A1 | 12/2005 | Rasmussen et al. | |
| 2006/0125422 A1 | 6/2006 | Costa | |
| 2006/0187593 A1 | 8/2006 | Mahawili | |
| 2007/0010916 A1 | 1/2007 | Rodgers et al. | |
| 2007/0155349 A1 | 7/2007 | Nelson et al. | |
| 2007/0168088 A1 | 7/2007 | Ewing et al. | |
| 2008/0046387 A1 | 2/2008 | Gopal et al. | |
| 2008/0177678 A1 | 7/2008 | Di Martini et al. | |
| 2008/0219239 A1 | 9/2008 | Bell et al. | |
| 2008/0221737 A1 | 9/2008 | Josephson et al. | |
| 2009/0063228 A1 | 3/2009 | Forbes, Jr. | |
| 2009/0073957 A1 | 3/2009 | Newland et al. | |

(56) References Cited

U.S. PATENT DOCUMENTS

| | | |
|---|---|---|
| 2010/0063641 A1 | 3/2010 | Scholten |
| 2010/0313270 A1* | 12/2010 | Kim .......................... G06F 1/28 |
| | | 726/24 |
| 2011/0254697 A1 | 10/2011 | Casey et al. |
| 2012/0004871 A1* | 1/2012 | Tsao ................... G01R 19/2513 |
| | | 702/61 |
| 2012/0294377 A1 | 11/2012 | Vijayasankar et al. |
| 2012/0311141 A1 | 12/2012 | Durazzo et al. |
| 2016/0224047 A1 | 8/2016 | Dzuban et al. |

* cited by examiner

PREMISES POWER USAGE MONITORING SYSTEM

CROSS-REFERENCE TO RELATED APPLICATION

This application is a continuation of U.S. patent application Ser. No. 14/717,899, filed May 20, 2015, entitled, "SMART ELECTRICAL OUTLETS AND ASSOCIATED NETWORKS," which is a continuation of U.S. patent application Ser. No. 13/763,480, filed Feb. 8, 2013, issued as U.S. Pat. No. 9,160,168 on Oct. 13, 2015, entitled, "SMART ELECTRICAL OUTLETS AND ASSOCIATED NETWORKS," and is a continuation of U.S. patent application Ser. No. 13/757,156, filed Feb. 1, 2013, entitled, "SMART ELECTRICAL OUTLETS AND ASSOCIATED NETWORKS," which is a continuation of U.S. patent application Ser. No. 12/569,377, filed Sep. 29, 2009, issued as U.S. Pat. No. 8,374,729 on Feb. 12, 2013, entitled, "SMART ELECTRICAL OUTLETS AND ASSOCIATED NETWORKS," which is a continuation of U.S. patent application Ser. No. 12/531,226, filed on Feb. 16, 2010, entitled, "SMART ELECTRICAL OUTLETS AND ASSOCIATED NETWORKS," which is a U.S. National Stage of PCT/US2008/057150, filed on Mar. 14, 2008, entitled, "SMART NEMA OUTLETS AND ASSOCIATED NETWORKS," which claims benefit of priority to U.S. Provisional Application No. 60/894,846, filed on Mar. 14, 2007, entitled, "SMART NEMA OUTLETS AND ASSOCIATED NETWORKS". The contents of all of the above-noted applications are incorporated herein by reference as if set forth in full and priority to these applications is claimed to the full extent allowable under U.S. law and regulations.

FIELD OF INVENTION

The present invention relates generally to electrical power distribution and management and, in particular, to an electrical outlet, or other device associated with a local (e.g., single or multiple residential or business premises) circuit, to intelligently monitor at least a portion of the circuit and control delivery of electricity over the circuit.

BACKGROUND OF THE INVENTION

Power distribution and electrical distribution are monitored and controlled for a variety of purposes. In this regard, power distribution generally refers to transmission between a power plant and substations whereas electrical distribution refers to delivery from a substation to consumers. Electricity is further distributed within consumer premises typically via a number of local circuits.

Power distribution may be monitored and controlled in relation to addressing actual or potential over capacity conditions. Such conditions have become increasingly common in the United States and elsewhere due to increasing industrial and residential power needs coupled with aging power infrastructure and practical limitations on new power generation. Over capacity conditions are often addressed by reducing or interrupting power provided to standard residential and commercial consumers, e.g., blackouts or brownouts. For example, during periods of peak usage, a rolling blackout may be implemented where power to grid subdivisions is sequentially interrupted to reduce the overall load on the grid.

The effects of such power interruptions can be ameliorated to some extent. Certain critical or high value customers may be exempted from rolling blackouts if the structure of the grid allows. Other critical facilities or equipment may be supported by generators or redundant, fail-safe power supplies. However, for many standard customers, power interruptions, and the consequences thereof to data systems and other vulnerable products, is simply endured. For these consumers, the interruptions are indiscriminate and, in many cases, total.

Electrical distribution is also monitored and controlled including at the internal premises level. For example, fuses, circuit breakers, ground fault indicators, surge protectors and the like are generally employed to interrupt or damp electricity on a circuit in the event that the current drawn by the circuit exceeds a prescribed level. These elements are typically required by code and may be customized to some extent, for example, with respect to circuits for supplying high (e.g. dryers, air conditioners) or low (e.g., lighting) power devices. However, these elements are generally unintelligent and limited to hazard avoidance. They typically do not recognize devices or device types when connected to a circuit, do not allow for addressing larger grid needs and are not sufficiently responsive for addressing certain safety issues such as potential electrocutions.

SUMMARY OF THE INVENTION

The present invention relates to intelligent circuit devices such as electrical outlets, e.g., standard NEMA or other electrical standard (e.g. CEE, BS, etc.) outlets, and to customer premises electrical systems, appliances, power distribution systems and associated processes that may utilize such smart circuit devices. The smart circuit devices of the present invention can monitor a load connected to a circuit and control distribution of power via the circuit. The circuit devices can also be controlled via a communications interface so as to implement a local or grid policy concerning electrical delivery or usage. In this manner, power can be distributed more efficiently, outlet and building wiring safety can be enhanced and electrical grid capacity problems can be addressed more effectively. Also, the invention delivers security and convenience features.

In accordance with one aspect of the present invention, a utility (including a system and associated functionality) is provided for enabling network messaging such as Transmission Control Protocol/Internet Protocol (TCP/IP) communication to an outlet receptacle, e.g., a standard NEMA or other standard outlet receptacle. In this manner, the receptacle effectively becomes a client or data network node. This enables a wide variety of functionality. For example, the outlet receptacles can operate as intelligent control points for electrical distribution, providing feedback concerning the types of devices that are currently plugged into the receptacles and selectively controlling the delivery of electricity via the receptacles (including reducing power consumption by eliminating individual power waveform cycles delivered via the receptacles via fast on/off switching or otherwise periodically interrupting or limiting power consumption). In addition, the receptacles can be controlled via a local area network, wide area network or other network using network protocols such as TCP/IP communications or other network protocols, such protocols transmitted via wired (including over local premise power wiring, cable TV data network, DSL, etc.) or wireless (802.11, Bluetooth, satellite, etc.) means so as to enable remote or intelligent operation of devices that are not otherwise adapted for data network control. The receptacle communication technology also provides a convenient mechanism for intelligent devices to communicate via power lines to a wide area network and facilitates standardization of such devices.

In this regard, though any network messaging protocol could be utilized, TCP/IP currently has a number of advantages including the following:

1. TCP/IP is the preferred protocol for communicating to the receptacles for both technical and economic reasons.

2. TCP/IP is the standard protocol on the internet, the largest network on the planet. It is an open protocol and very unlikely to be replaced.

3. TCP implementations and supporting infrastructure continue to improve. In particular, it is now possible to get very small and lightweight implementations of TCP suitable for the processing power that can be easily embedded in a heat limited small space such as a receptacle box.

4. The overwhelming adoption of TCP/IP is driving the cost point of TCP infrastructure devices down and down. This is a very strong reason to choose it.

In accordance with another aspect of the present invention, a utility is provided for controlling delivery of power via a local (e.g., on-premises) circuit device such as a receptacle or group of receptacles based on a load analysis. Specifically, the utility involves monitoring at least one local circuit device to determine information regarding a loading of the local circuit device based on an analysis (e.g., digital processing) of an electrical signal transmitted via the circuit device, and controlling delivery of power via the circuit device based on the analysis. The analysis may be implemented by a digital processor at the circuit device such as at an outlet or at another location (e.g., at a circuit breaker panel or elsewhere on a controlled circuit). For example, different electrical devices or appliances may produce different electrical signatures that can be detected at a receptacle. Accordingly, the electrical signal can be analyzed to determine a classification of an electrical device, e.g., to identify the specific electrical device or the type of electrical device (or an intelligent device can identify itself), to set power delivery policies (e.g., based on monitored usage patterns), to identify power delivery quality issues (in either the power supplied or the electrical wiring), to provide virtual Ground Fault Circuit Interruption (GFCI) functionality in specified receptacles as needed by comparing summary current measurements to neutral current, or to identify a loading anomaly or safety issue. This information may be used to, for example, reduce the power delivered to the device (e.g., via rapid switching to eliminate selected cycles of the power signal or by interrupting power to the device for a given time period(s)) or to assign the device/receptacle a priority level in the event of power reduction (e.g., a brownout). Alternatively, the digital analysis may indicate a short circuit, a potential shock or electrocution event or other safety concern. In such cases, power to the receptacle may be interrupted. Also, if a device switch is not supposed to be on, e.g., if the resident is on vacation and a light is suddenly turned on, a security alert can be generated as well as an email alert.

Relatedly, a fast power switching function can be implemented to control power delivery. Such fast switching structure can be used in at least two ways: 1) arc suppression when turning on/off main relays; and 2) fast switching when "stealing" cycles. Traditional mechanical switching relays are generally not viewed as appropriate for the latter function due to the speed of operation required. Rather, this may be accomplished by solid state switching such as triacs or MOS devices. More generally, the desired attributes for this switching function include: the switch generally needs to handle high current environments (in contrast to many microelectronic environments); and the switch should present a low voltage drop thus producing heat at a lower rate. It has been recognized that heat generation may be problematic, particularly in relation to implementations where the switching function is executed in an outlet box or in other constrained, unventilated contexts. In order to minimize heat production, a fast switching device (e.g., semiconductor power switch) may be used in conjunction with a traditional mechanical relay, each controlled by a combination of analog and digital circuitry. In this manner, the fast switching times needed to support the requirements of this system can be attained, while the mechanical relay provides the necessary low speed switching and low heat production. The semiconductor switching devices (e.g., triacs, Metal Oxide Semiconductors, etc.) are fast but will produce some heat. The mechanical relays are relatively slow but produce little heat. When operated in conjunction with each other under microprocessor or other digital means control, the two switching devices can provide the necessary fast switching with acceptable levels of heat production. Alternatively, a fully solid state switching device may be used while addressing the desired attributes noted above. It will be appreciated, though, that the desired switch is faster than traditional mechanical switching devices, and involves higher power signals than many conventional solid state switches, but also does not require the speed of some conventional solid state switches. It is expected that a variety of solutions may thus be devised.

Relatedly, according to a further aspect of the present invention, a receptacle can be used either to selectively interrupt power supply or to selectively deliver power to associated electrical devices or loads. In the latter regard, it may be desired to selectively deliver power for various reasons including to supply power in accordance with a policy, to supply power in accordance with an inferred or otherwise known usage pattern, or to monitor an idle device for any change in state. In this regard, the previously mentioned fast switching feature can further be utilized to periodically apply a short duration application of power, for example, a single half cycle (or multiple thereof) of AC power, to an otherwise powered off device or devices. This can be done for the purpose of sampling a signature response for that half cycle (or multiple thereof) to determine certain characteristics of the attached device(s). For example, power may be supplied for a time interval sufficient to obtain a load signature. It is expected that, in many cases, this may be accomplished on a cycle or subcycle basis, e.g., by supplying a half cycle or full cycle (or other ½ cycle multiple) of parts to take advantage of switching at zero crossings. This feature is preferably performed in coordination with the aforementioned analysis capability. During the initial analysis acquisition session, e.g. when the device is first plugged into a smart receptacle, and an analysis is performed, the smart receptacle will sample the power signal applied to acquire the electrical current waveform (signature) associated with the new device. The device can then be turned off by the smart receptacle momentarily, and after a short wait period, the device is turned on for one half AC cycle (or other interval). During that one half AC cycle, the current waveform is again sampled, and a second "signature" is related to the device.

This signature can be used to examine the receptacle every so often as desired when the power to the device is turned off by the smart receptacles by applying a short duration of power and sampling the resulting waveform as previously described and analyzing the resulting signature. This analysis can be used to determine whether the device is still present, if the device remains in an off or idle state, or if other devices are present, i.e., additional loads have been connected to the smart receptacle being sampled. This is particularly useful in detecting if receptacle has attached power transformers, or converters, such as are commonly found on consumer electronics, and if they are idle or loaded. In this example, a cell phone charger, for example, could be sampled when it is charging and when it is not charging a cell phone, and waveforms could be recorded for each of these states. When in operation, the smart receptacles can then detect if the cell phone is connected to the charger (which in turn is connected to the smart receptacle) or if the cell phone is not connected. In either case, the charger would remain connected to the smart receptacle. In the case of the cell phone not being connected to the charger, it is desirable to not deliver power to the receptacle, thus reducing the quiescent load.

This load, although small, is significant when multiplied by many hundreds of millions throughout the grid. A significant power savings overall can be realized simply by shutting down unused wall power adapters. This same feature of the smart receptacle is useful for a large class of attached devices. Some examples include: personal computers, laptops, etc., electric shavers, and nearly all rechargeable consumer appliances charged with an external charger. Televisions and consumer audio equipment are also examples of devices that can be powered off completely when not in use, but that often have a small quiescent power draw. In the US alone, it is estimated the average household has at least 10 such devices. If, for example, each of those devices draws 10 one-thousandths of an amp (10 milliamps), and there are 100 million households (for example) the total potential unnecessary load is 10 million amps (at 120 VAC)=1200 megawatts, resulting in a significant carbon dioxide output.

In accordance with another aspect of the present invention, a local circuit device such as a receptacle module communicates with a controller via electrical power wiring of the premises. An associated subsystem includes an electrical device that receives power through electrical wiring of a customer premises via an electrical circuit and a switch module, associated with the local circuit device, for controlling delivery of power to the electrical device. The utility further includes a receptacle controller for controlling operation of the switch module. The switch module and the receptacle controller preferably communicate via the electrical wiring using an internet communication protocol (e.g., UDP and/or TCP/IP) or use other protocols which a local controller (e.g., an internet connected device) can gateway and/or proxy to TCP/IP such that the switch module and/or a device plugged into the receptacle of a switch module can communicate via TCP/IP. The subsystem can be used to coordinate power delivery via the receptacle in relation to a larger power distribution system, e.g., the power grid. Alternatively, the subsystem can be used to allow for monitoring and controlling operation of the electrical device remotely, e.g., via the internet.

The present invention can also be implemented in the context of a data center. Data centers often include a power strip including outlets associated with two separate sources. For example, one such power strip product is being developed by Zonit Structured Solutions. The power strip can thus implement switching functionality as discussed above so as to provide redundant power supplies, e.g., for critical data devices. However, it will be appreciated that it will generally not be desirable to steal cycles from data devices and that switching will normally only be implemented in connection with power interruptions. Accordingly, heat budget concerns are greatly reduced, and the fast power switching functionality may not be necessary but could be implemented nonetheless, if practical.

In a residential, commercial or data center context, a controller can communicate with the receptacles by TCP/IP protocol, as discussed above. When using power lines for such communications, it is useful to provide some mechanism to avoid cross-talk. That is, because the power lines that ultimately extend between multiple receptacles effectively define a single electrical bus or interconnected circuits. Instructions from the controller intended for a first receptacle could be received by and acted upon by a second receptacle absent some mechanism to limit the transmission of messages or to allow receptacles to discriminate as between received messages. An addressing mechanism for delivering messages to specific individual receptacles of a set of controlled receptacles can resolve the issue within a given control domain. A mechanism to limit the transmission of messages between central domains can resolve the issue between control domains. It is also desirable to limit the transmission of messages via power lines so as to keep the power waveform clean. This may be accomplished by signal cancellation or attenuation at the control point, e.g., a local controller, for a set of power receptacles. Specifically, the local controller is associated with a transceiver for inserting communication signals directed to the controlled outlets into a power line and receiving communication signals from the receptacles via the power line. An attenuation or cancellation device can be provided external to this transceiver, i.e., between the transceiver and the power network external to the controlled domain. In this regard, cancellation involves specifically eliminating particular signals such as through use of an active cancellation signal, or passive filtering, based on the signal to be cancelled. Attenuation relates to employing a frequency dependent filter to selectively exclude the frequency or frequencies used to communicate via the internal power wiring from transmission to the power network external to the controlled domain.

In addition, it will be appreciated that the control functionality discussed above can be implemented at an electrical device rather than at an outlet or other local circuit device (or at an intermediate unit interposed between the electrical device and the outlet). That is, from a communications viewpoint, there is little distinction between the device and the outlet where the device is plugged in; communications can be transmitted via the power lines all the way to the device. Thus, the smart switch or other communication and control technology can alternatively be implemented by custom manufactured or retrofitted devices. In the context of a data center, data may be accumulated and viewed (via an LCD or LED panel or web interface) at a power strip, an associated controller or remotely. In this regard, the need for additional cabling to support instruments (such as thermometers, airflow sensors, door lock sensors, light or humidity sensors, etc.) is reduced, thereby simplifying servicing, conserving rack space and enhancing cooling airflow.

According to a still further aspect of the present invention, an intelligent electrical outlet is provided. The outlet includes a receptacle for receiving a standard electrical plug so as to establish an electrical connection—between a device associated with the plug and a premises wiring system associated with the receptacle—and a digital processor for controlling delivery of power via the receptacle. For example, the digital processor may be embodied in a circuit board that can be housed within a standard outlet housing, e.g., to execute the fast power switching functionality as described above. In this manner, intelligent monitoring and control can be implemented at the individual outlet level or individual receptacle level of a power distribution system.

In accordance with a still further aspect of the present invention, a power distribution system is provided that allows for greater monitoring or control of power distribution, including control at the customer premises level. The system includes a power grid for distributing power over a geographic distribution area, one or more grid controllers for controlling distribution of power across the power grid and a number of customer premises (local) controllers. Each of the customer premises controllers control delivery of power within a particular customer premises based on communication between the customer premises controller and at least one of the grid controllers. For example, the customer premises controllers may be implemented at the customer premises level and/or at the individual outlet level within the customer premises. A customer premise controller can be replicated for increased reliability and suitable means can be used to insure that the replicated controllers cooperate properly in how they manage the receptacles they control. Also, a local customer premise can have multiple controllers (each of which can be replicated) that control different subsets of the set of smart receptacles in the customer premise. This may be useful in some scenarios such as a multi-tenant office building, for example. The local controllers can use the network address space or lists of network addresses or other means to specify which smart receptacles they control.

This in conjunction with an appropriate link-level protocol (such as Ethernet for example) allows all of the local premise controllers to co-exist and function on the same customer premise wiring network when communicating with the receptacles they control or each other. An attenuation or cancellation device can be used as described previously to limit all of the customer premise local controllers and smart receptacle transmissions to only the customer premise wiring. As can be appreciated, it is possible to use a variety of security methods, such as used in TCP/IP and other network protocols, to insure that only an authorized set of local controllers can control a desired set or sub-set of local smart receptacles. Further, it is possible to provide multiple user accounts on each controller with separate privileges. These logins can be managed using a variety of authentication, authorization and accounting features such as are used to manage user accounts on a variety of modern operating systems, for example Linux, Unix, VxWorks, etc.

It is noted in this regard that the local controller (whether implemented at the outlet and/or elsewhere on the customer premises) may execute purely local policies, policies driven by external (e.g., grid) controllers, or combinations thereof. For example, the local controller may control power delivery based on local policies concerning branch wiring current limits, security policies, safety policies, or other policies not requiring communication with or coordination with a grid controller or other external controller. Conversely, the local controller may be utilized to execute a grid-based or other external policy, such as a brownout operating mode. In still other cases, the local controller may make decisions based on both local and external considerations. For example, a grid controller may instruct local controllers, on a mandatory or voluntary basis, to operate in conservation mode. Local controllers may then execute a conservation mode of operation in accordance with local policies, e.g., concerning which devices may be turned off or operated in reduced power mode or which devices have priority for continued operation.

In accordance with a still further aspect of the present invention, a method is provided for addressing over-capacity conditions in a power distribution grid. The method includes the steps of identifying an over-capacity condition with respect to at least a portion of a power distribution grid and addressing the over-capacity condition by controlling power distribution at a level finer than the finest distribution subdivision of the power distribution grid. In particular, the over-capacity condition relates to a condition potentially requiring reduction of power provided to standard residential and commercial customers, e.g., conditions that have conventionally resulted in blackouts or brownouts. In some cases, such conditions have been addressed by a rolling blackout, as discussed above, where a grid is divided into a number of grid subdivisions, and power to these grid subdivisions is sequentially interrupted to reduce the overall load on the grid. The present invention allows for addressing such conditions at a finer and/or more flexible level than these network subdivisions. In this manner, individual residences, commercial clients, or any desired set of customer premises can be managed as a group independent of grid topology. For example, power distribution may be controlled at the endpoint receptacle and electrical distribution rather than the power distribution portion of the distribution network. As noted above, power distribution generally refers to transmission between a power plant and substations whereas electrical distribution refers to delivery from a substation to the consumers. For example, in accordance with the present invention, power distribution may be controlled at the customer premises level or even at the outlet level within a customer premises. Moreover, power distribution may be controlled by reducing the delivery of power, e.g., by eliminating certain cycles, or by interrupting power distribution. In this manner, blackouts or brownouts can be avoided or implemented more intelligently so as to avoid the harm or inconvenience associated with such blackouts or brownouts.

In accordance with a still further aspect of the present invention, a system is provided for controlling a device that is plugged into a smart outlet. The system can be used in a variety of contexts, including data center control, as well as controlling electrical devices in a residential or business environment. The system includes a local controller and one or more smart outlets. The local controller can communicate with a remote controller via a first protocol and with the smart outlet via a second protocol the same or different than the first protocol. In this regard, the local controller can function as a protocol gateway to translate messages between the first and second protocols. For example, the local controller may communicate with the remote controller via a wide area network such as the internet. Again, it should be appreciated that any method of implementing the TCP/IP WAN (wireless, cable, modem, ISPN, DSL, satellite, etc.) may be employed. In addition, the local controller may communicate with the smart outlet via power lines, wirelessly or via another communications pathway. In this regard, communications between the local controller and the smart outlet are preferably conducted in accordance with a TCP/IP protocol adapted for the local environment. In one implementation, the local controller is implemented in conjunction with a power distribution unit of a data center. The smart outlet may be implemented in conjunction with a data center power strip. In this manner, data center equipment can be conveniently controlled from a remote location. In addition, data center devices, such as temperature sensors, humidity sensors or door lock sensors, can report to a remote location as may be desired.

In accordance with a still further aspect of the present invention, a local controller can function as a communications gateway for multiple appliances, smart receptacles or combinations of appliances and smart receptacles associated with the local controller. In this regard, the local controller can execute TCP/IP over power wiring functionality or other data protocol. The local controller can then gateway all local devices to a WAN. In this manner, all local appliances can communicate to and be controlled via the WAN. Some examples of what this enables include: allowing a smart refrigerator to order food from a market as necessary; allowing a furnace to report via the WAN that it is leaking carbon monoxide into the forced air; and an air conditioner can report via a WAN that the fan motor is about to fail.

The local controller can gateway such communications in at least the following ways. First, and preferably from a standardization standpoint, such communications can be TCP/IP from end-to-end. The local controller thus acts as a TCP/IP router (and power line transceiver). The local controller may also act as a firewall. In this case, both endpoints of the communication "speak" TCP/IP. Second, the local controller may gateway and proxy between TCP/IP and another communications protocol (over power wiring). Again, the local controller acts as a gateway router and can act as a firewall. In this case, the appliance being controlled speaks in its native communications protocol (which could be used to encapsulate TCP/IP) to the local controller and the local controller speaks TCP/IP (which, inversely, can be used to encapsulate the appliance communication protocol) to the WAN.

The TCP/IP gateway provided by the local controller as discussed above has several functions. First the gateway provides universal and uniform TCP/IP WAN connectivity. All smart receptacles and electrical devices connected to them with suitable adapters or internal hardware can communicate via TCP/IP to a WAN (such as the internet) via the local controller. This can be done regardless of what protocol is used to communicate over the power wiring in the facility, but it is preferred to be via TCP/IP also. The TCP/IP communication functions offered by the controller are those which are commonly used to interconnect any two TCP/IP networks. Some of which include the following:

1. Routing. TCP/IP Data transmissions from smart receptacles and devices on the power-wiring network to the TCP/IP WAN are enabled and vice versa.

2. Network Address Translation. Only one public TCP/IP routable address on the TCP/IP WAN is needed for complete connectivity.

3. Protocol Encapsulation. If one or more non-TCP protocols are used by smart receptacles and/or devices on the power-wiring network, they can be bi-directionally encapsulated and thereby enable end-to-end communication between the device on the power wiring network and an endpoint on the TCP/IP WAN. TCP/IP can be used to encapsulate the protocol(s) used on the power wiring network and inversely the power wiring network protocol can be used to encapsulate TCP/IP to a receptacle or device on the power-wiring network. The latter is possible but not a preferred method.

4. Proxy Server Function. If it is desired all devices on the power-wiring network can be proxied by the TCP/IP proxy functionality of the controller. This may be a convenient way to communicate with and control the receptacles and devices on the power-wiring network.

The gateway also provides security and privacy functionality. The TCP/IP gateway in the local controller also acts as a firewall to monitor and control the data connections from the power wiring network smart receptacles and attached electrical devices to devices on the TCP/IP WAN. The gateway can also be configured to control all connections locally between devices using the firewall. Policies can be set to control, limit and report on this connectivity. In this way the privacy and security of the homeowner or facility owner can be safeguarded.

BRIEF DESCRIPTION OF THE DRAWINGS

For a more complete understanding of the present invention, and further advantages thereof, reference is now made to the following detailed description, taken in conjunction with the drawings in which.

DETAILED DESCRIPTION

Figure 1A:
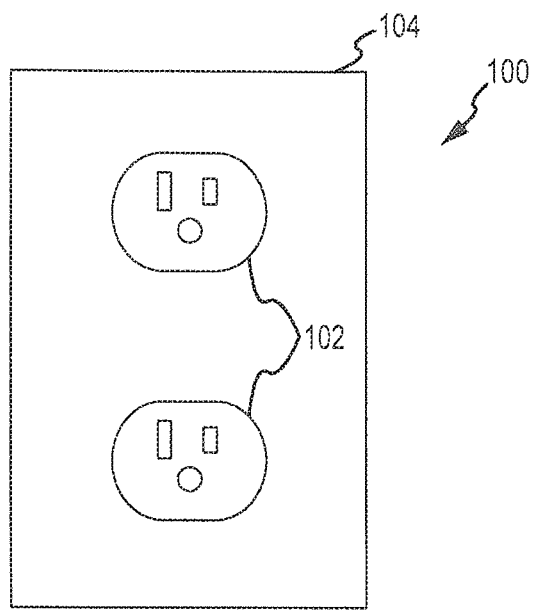
FIGS. 1A and 1B illustrate front and side views, respectively, of a smart outlet box in accordance with the present invention.
Figure 1B:
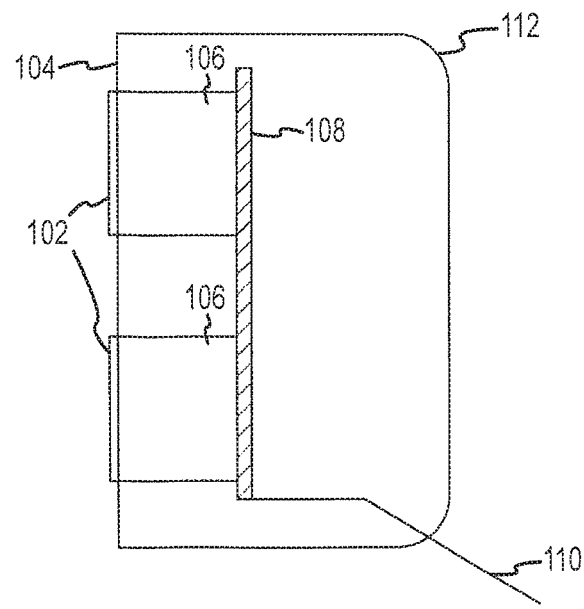

The present invention is directed to intelligent local circuit devices that can control power delivered to an electrical device via a circuit and/or report information about or from an electrical device connected to a circuit. This allows for remotely monitoring and/or controlling electrical devices, including standard electrical devices that are not specially adapted for such remote monitoring or control, which could be useful in a wide variety of applications. In the following description, the invention is set forth in the context of standard NEMA or other recognized electrical standard (e.g., CEE, BS, etc.) electrical receptacle outlets provided with logic for monitoring connected loads and sampling power waveforms (e.g., electrical appliances and devices) and for selectively controlling power delivered via the outlets. Thereafter, certain systems for taking advantage of this functionality are described. In particular, power grid distribution systems and data center equipment control and power distribution systems are described. It will be appreciated that circuit devices other than electrical receptacle outlets and applications other than the noted power grid and data center applications, are supported by the technology of the present invention. Accordingly, the following description should be understood as illustrative and not by way of limitation.

The invention may be more fully understood by reference to FIGS. 1-4. Referring first to FIGS. 1A and 1B, front and side views, respectively, of an intelligent outlet in accordance with the present invention are shown. The illustrated outlet 100 includes two standard receptacles 102 accessible through a faceplate 104. Each of the receptacles 102 includes a receptacle body 106 for receiving a standard electrical plug and establishing an electrical connection between prongs of the plug and wiring 110 associated with the wiring system of the customer premises, e.g., a residence or business. The illustrated receptacle 100 further includes a controller 108 mounted within the outlet housing 112 in the illustrated embodiment. For example, the controller 108 may be embodied as an integrated circuit board. As will be discussed in more detail below, the controller 108 is operative for monitoring a loading with respect to each of the receptacles 102 and controlling delivery of power to the receptacles 106. For example, this may be done to classify an electrical device connected via the receptacles 106 or to identify a safety hazard. Delivery of power to the receptacles 102 may be controlled to alleviate a safety concern, to enhance efficiency of power distribution, to remotely control an electrical device connected to one of the receptacles 102, or to address a potential or actual over capacity condition of a power grid. The controller 108 may also be operative for communicating with other controllers, e.g., within the customer premises, at a separate customer premises or with network controllers outside of the customer premises. For example, such communications may be conducted via power lines, wirelessly or via other communications pathways.

Figure 2:
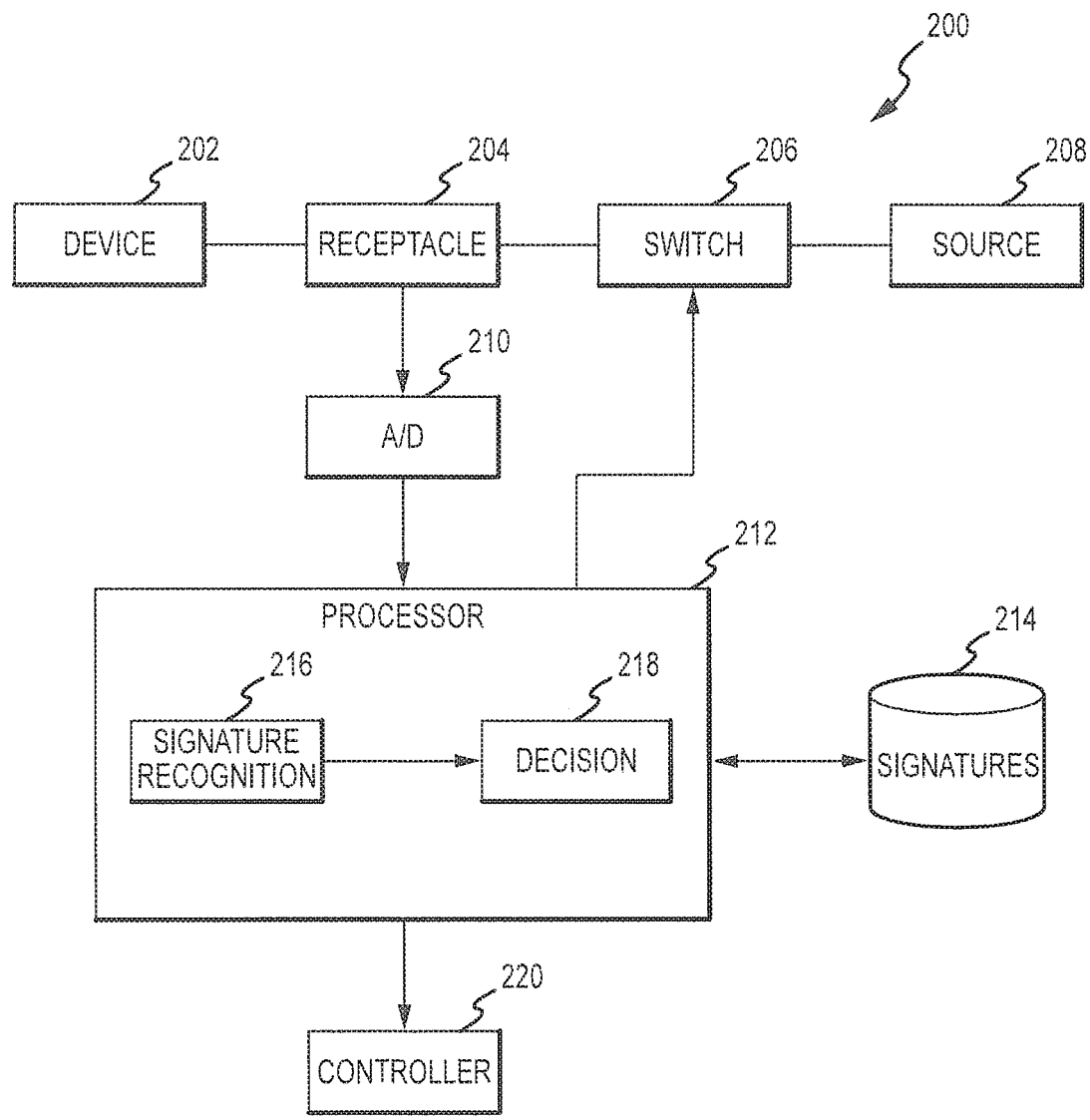
FIG. 2 is a schematic diagram of a smart outlet system in accordance with the present invention.

FIG. 2 is a schematic diagram of a power distribution system 200 in accordance with the present invention. The illustrated system 200 includes an electrical device 202 that is plugged into an electrical receptacle 204. The receptacle 204 selectively receives power from a power source 208, such as an electrical grid, via a switch 206. The switch 206 may be located at the receptacle 204 or at a remote location, such as at a circuit breaker board or other location associated with a circuit for providing electricity to the receptacle 204.

In the illustrated embodiment, the switch 206 is operated by a processor 212 based on monitoring of an electrical signal at the receptacle 204. For example, the processor 212 may be located at the receptacle, at a separate location on the customer premises (e.g., a computer configured to control a number of outlets) or at another location. In this regard, the signal at the receptacle 204 may be monitored to identify an electrical signature that identifies the device 202 or the type of the device 202. It will be appreciated that different types of electrical devices have different characteristics in relation to how they load the electrical system. For example, an electrical pump may have a different signature than an electrical light. This signature may relate to the power drawn, a time-dependent characteristic of the power drawn, or other cognizable signal characteristic from the power signal delivered via the receptacle 204. Alternatively, an intelligent device may identify itself to the receptacles, e.g., by transmitting a standard identification code.

The nature of the signature may be determined theoretically or empirically. For example, heuristic logic may be used to learn and parameterize electrical signatures for different devices of interest. Such signature information can then be stored in a signature database 214. Accordingly, the illustrated system 200 includes an analog-to-digital converter 210 for digitally sampling the electrical signal at the receptacle 204 and providing digital information representative of the signal to the processor 212. This digital information is then processed by a signature recognition module 216 of the processor 212 to identify the signature. For example, the input digital signal may be processed by algorithms to determine a number of parameters of the signal, which can then be compared to parameters stored in the signature database 214 to match the input signal to one of the stored signatures. It will be appreciated that the signature information can also be used to determine a state of the device 202 or to detect an output from the device (e.g., in the event that the device 202 is a sensor that provides an output signal).

An output from the signature recognition module 216 can then be used by a decision module 218 to control delivery of power to the receptacle 204. In this regard, the decision module 218 may also use information input from a controller 220, which may be disposed at the outlet, elsewhere in the customer premises (such as a computer), or at another location. In one implementation, the controller 220 is in communication with the larger power distribution system, e.g., the power grid. For example, if the device 202 is recognized as a device that can function at a reduced power level, the decision module 218 may operate the switch 206 to reduce power delivery to the receptacle 204. In this regard, it is possible to "steal" a certain number or percentage of power signal cycles without unacceptably affecting the performance of certain devices. In such applications involving frequent switching, the fast switching functionality discussed above allows operation within the available heat budget, as will be discussed below. Appropriate switching mechanisms are described in U.S. Provisional Patent Application Ser. No. 60/894,842 and U.S. Patent Application Serial No. PCT/US2008/057140, which claims priority therefrom, and U.S. Provisional Patent Application Ser. No. 60/894,848 and U.S. Patent Application Serial No. PCT/US2008/057144, which claims priority therefrom, which are incorporated herein by reference. The decision module 208 may be programmed to implement such a power reduction by the customer or a power provider, such as a public utility.

In other cases, the controller 220 may direct the decision module 218 to go into a power saving mode. For example, this may occur when an over-capacity condition is identified with respect to the power grid or a portion of the power grid. In such cases, the decision module 218 may reduce or eliminate power delivery to certain classes of devices.

As a further example, the signature recognition module 216 may determine that the device 202 does not match any signature authorized for use at the receptacle 204. In such cases, the decision module 218 may operate the switch 206 to interrupt delivery of power from the source 208 to the receptacle 204. Similarly, the decision module 218 may interrupt power delivery in the event of a potential short circuit, a potential shock or electrocution, or other potential safety hazard event.

It will be appreciated that the system 200 may be used for a variety of other purposes. For example, the processor 212 may operate the switch 206 to turn on lights or operate other electrical equipment on a periodic or random basis to create the illusion that the premises are occupied and thereby discourage crime. In addition, the processor may monitor the receptacle 204, for example, to identify activities when the premises are supposed to be vacant, thereby identifying possible crime or unauthorized use. Moreover, the processor 212 may be used to allow for remote control of the receptacle 204, for example, to allow an owner to remotely operate electrical devices via the internet or other WAN. It will be appreciated that the various functional components noted in this discussion may be combined on a common platform or distributed across multiple platforms (e.g., at the outlet, a separate customer premises platform or other platforms) in any appropriate manner.

Figure 3:
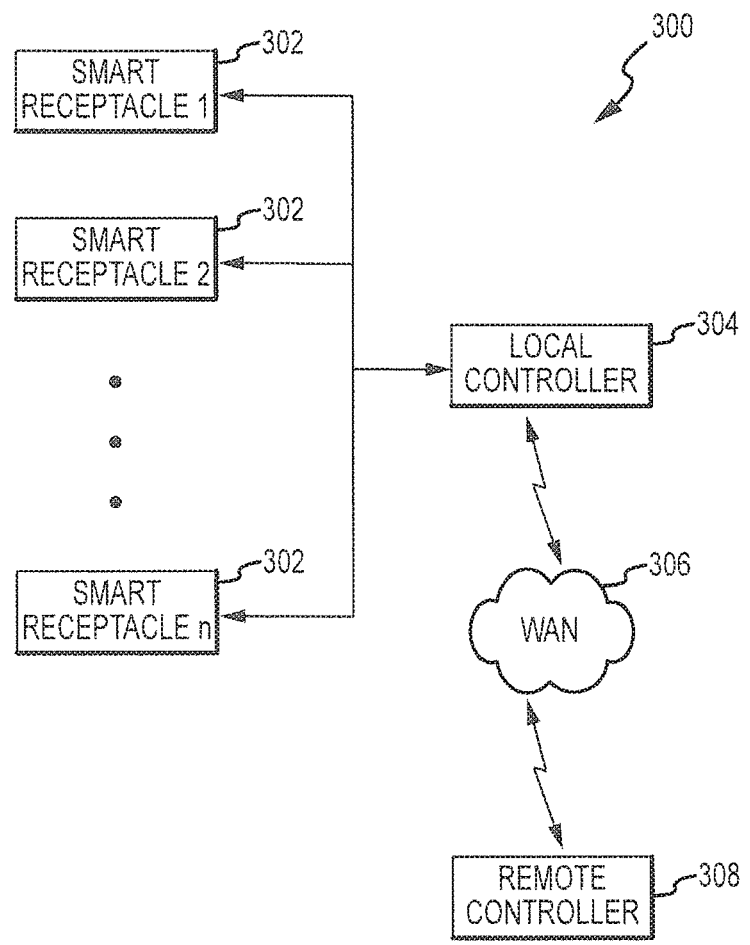
FIG. 3 is a schematic diagram of a smart outlet system implemented in a wide area network context in accordance with the present invention.

FIG. 3 illustrates a system 300 in accordance with the present invention for enabling remote monitoring and/or control of multiple receptacles. In particular, the system 300 includes a number of smart receptacles 302, which may be, for example, receptacles as discussed above in connection with FIGS. 1A and 1B. The receptacles 302 communicate with a local controller 304, which may be, for example, a computer or internet terminal located at the customer premises. For example, the smart receptacles 302 and the local controller 304 may communicate via an internet protocol (e.g., TCP/IP) or a proprietary protocol that is gatewayed to the WAN over electrical wires of the customer premises. The local controller 304 can, in turn, communicate with a remote controller 308 via a wide area network 306 such as the internet. In this regard, the communication between the local controller 304 and the remote controller 308 may involve wireless (e.g., IEEE 802.11, Wi-Fi, telephony or other wireless) or other data network links. The remote controller 308 may be operated by a private or public party. For example, the remote controller may comprise a computer used by an owner of the customer premises to remotely control the receptacles 302, a computer monitored by a security contractor to monitor activities at the receptacles 302, a controller of the power grid operated to implement intelligent blackouts or brownouts or any other entity.

Figure 4A:
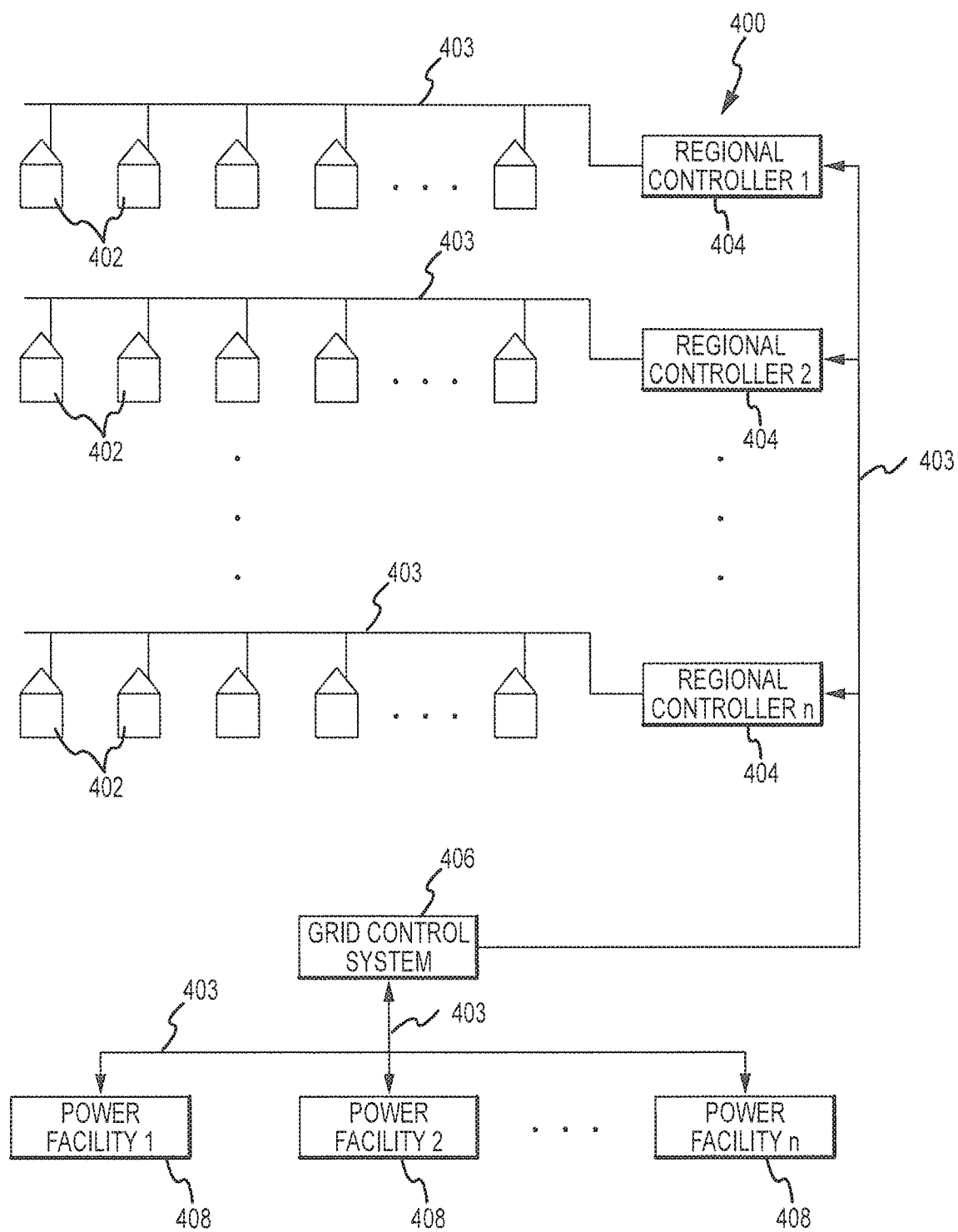
FIGS. 4A and 4B illustrate a power distribution grid utilizing smart outlet technology in accordance with the present invention.
Figure 4B:
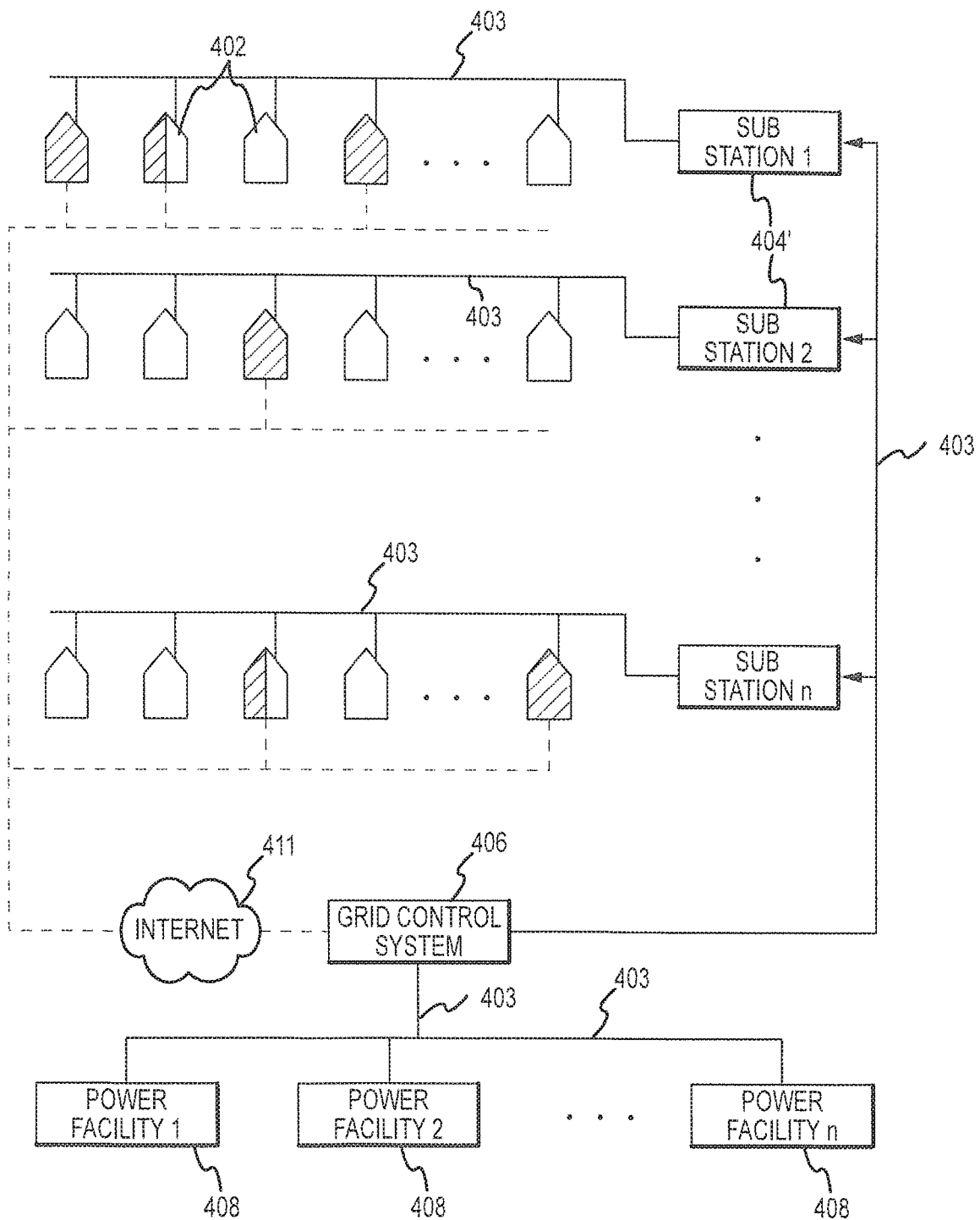

FIG. 4A illustrates a power distribution network 400 for intelligently controlling power distribution. The illustrated network 400 includes a number of customer premises 402 connected to a power grid 403. The power grid 403 receives power from a number of power facilities 408, and distribution of power across the grid 403 is controlled by a central grid control system 406 and, optionally, a number of regional controllers 404, such as substations. As discussed above, each of the customer premises 402 may include a number of intelligent outlets. These outlets may be controlled in response to instructions from the central control system 406 or regional controllers 404. Thus, for example, the customers may choose to or be required to install intelligent outlets that operate in response to such instructions from the central control system 406 or regional controllers 404 to reduce power consumption on a routine basis or in the event of over-capacity conditions.

Though the control functionality is discussed in FIG. 4A in relation to a grid control system and substations, it will be appreciated that control messaging need not be via power lines and that such control is not limited by power network topology. This is explicitly shown in FIG. 4B. In this case, control messages are directed to individual customer premises via a separate network such as the internet 411. In this manner, a given set of instructions can be delivered to a subset of residences (shaded) independent of power network topology associated with substation 404. Moreover, as discussed above, instructions may be implemented on a scale finer than individual residences, e.g., on an outlet-by-outlet basis (as indicated by partially shaded residences). In this manner, for example, a brownout may be implemented intelligently, e.g., by interrupting power to non-critical devices and/or stealing power cycles from appropriate types of devices.

Figure 5:
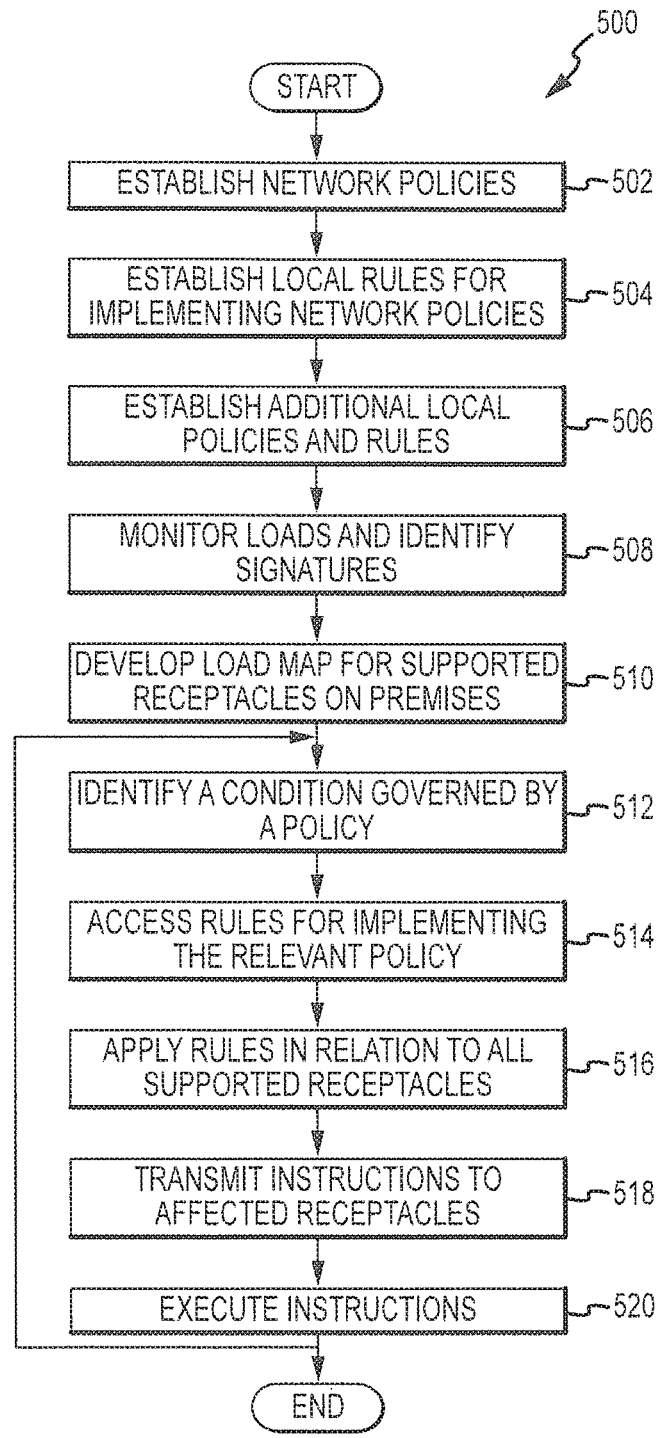
FIG. 5 is a flow chart illustrating a process for controlling electrical devices utilizing a smart outlet system in accordance with the present invention.

FIG. 5 illustrates a process 500 for monitoring and controlling electrical devices in accordance with the present invention. This process 500 will be described in relation to applications that enable monitoring and remote control of electrical devices connected to smart outlets as described above, including applications for allowing control of electrical devices by the operator of a power grid. The illustrated process 500 is initiated by establishing (502) network policies related to power usage within the network. For example, such policies may be established by an electrical utility in order to address potential or actual overcapacity situations that have previously been addressed, for example, by rolling blackouts or brownouts. It will be appreciated that these policies may be established in any way that is deemed useful by the power provider. Some examples are provided below:

1. Efficiency Mode

In the efficiency mode, individual residences that are subject to the policy are instructed to reduce power consumption by a certain percentage. This may be implemented at the residence by disabling selected devices and/or reducing power consumption by certain devices, as will be described in more detail below.

2. Brownout Mode

In the brownout mode, the highest loads (e.g., air conditioning, electrical heating, etc.) are identified and serially shut down for short periods of time (e.g., 5-10 minutes) to reduce overall peak load. In order to avoid having all homes and business shut down such loads at once, instructions may be sent to residences or executed at residences in a random, pseudo random or otherwise time distributed manner. For example, a residence may be assigned an identification code by a random number generator. Thereafter, instructions to execute the brownout mode may be sent out or executed on a time dependent basis as a function of code, e.g., at a given time, the brownout mode may be executed by all residences having an identification that ends in the number "5." Statistically, this can be accomplished in a way such that the peak load will be reduced by the needed percentage, but the impact to end users is minimized.

3. Blackout Mode

In the blackout mode, critical loads (e.g., refrigerators, lights, radios, radiant heating circulation pumps, etc.) can be identified and allowed on a full power or reduced power basis as appropriate. Non-critical items may be disabled.

It will be appreciated that many other modes of operation and associated policies may be defined. In the illustrated process 500, once the network policies have been established, local rules are established (504) for implementing the network policies. This optional implementation allows residential or business customers to have some input, for at least some policies, as to how such policies will be implemented. For example, the customer may define which appliances or devices are critical for purposes of executing a brownout or blackout policy. Moreover, a customer may be allowed to determine whether a prescribed energy reduction will be executed by disabling devices, reducing power drawn by devices or some combination thereof. Moreover, in certain implementations, consumers may be allowed to request time periods during which energy use will be reduced in order to achieve the purposes of the policy at issue. Though it may not be possible, as a practical matter, to accommodate all such requests, some requests may be accommodated at least to an extent, thereby reducing the impact on users.

Additional local policies and rules may be established (506) to take advantage of the smart outlets. For example, a customer may choose to operate in an efficiency mode at certain times or under certain conditions (e.g., while on vacation or when the premises are otherwise vacant). In addition, as noted above, a customer may wish to monitor the types of devices that are connected at individual receptacles or power usage, for example, for security purposes. In this regard, the customer may wish to be notified of certain events, e.g., when a light is turned on when no one is supposed to be present at the premises, to have a third party notified of certain events (e.g., a security or emergency service provider) or to prohibit certain uses (e.g., to prohibit use of lights, equipment, operation of electronic door locks or the like at certain times or under certain conditions).

By way of example, the policies that may be implemented by a customer include the following:

1. Secure Travel Mode

In the secure travel mode, devices such as lights, radios and the like may be turned on and off in a random, pseudo random or selected pattern to make the home or business appear occupied. This may be preprogrammed or controlled, for example, by the home/business owner, from a remote location. In the latter regard, the devices may be controlled remotely via appropriate messages transmitted via the internet or another network. In addition, in the secure travel mode, an email alert may be sent to a selected address in the event that a device is manually turned on. Alternatively or additionally, a security or emergency service provider may be contacted.

2. Living Mode

Using a local, web or other interface, an occupant can program when to turn on/off any device. For example, selected devices may be turned on or off in predetermined relation to a wake up time, departure for work time, return from work time or bedtime.

3. Efficiency Mode

In efficiency mode, the system can automatically turn off or on or reduce power to lights or other devices during preset time periods or by monitoring them to determine if their state is active or idle. For example, specified receptacles may be turned off during time periods where the residence is normally unoccupied or the residents are asleep. As an enhancement to this mode, devices can be monitored to determine when they have been manually turned off. When this occurs, the system may assume the occupant wants to turn the device back on manually and therefore turn on the receptacle. It can be appreciated that the system can also store, sum and display realtime and/or historical power usage data to inform user of energy usage details.

4. Safety Mode

In the safety mode, the user can select to disable certain receptacles that can be reached by small children or unused receptacles that are in a child's bedroom.

In addition to the various policies and rules that have been discussed above, a number of advantages are provided by the system of the present invention. In particular, since the system can detect short circuits in very short times (e.g., in $\frac{1}{60}$ of a second or less), the potential for serious electrical shocks is greatly reduced, not to mention the damage caused to equipment by short circuits. Moreover, the ability to analyze the power signature at the receptacles and then compare it to a standard or threshold has a number of benefits, including the following:

1. Quick Reaction to Shorts

All supported receptacles become "quick-acting" in responding to a short circuit and can be deactivated very quickly, thus enhancing safety to people and equipment.

2. De-Rate Old Wiring or Breakers

Circuits can be "de-rated" if their wiring is old or otherwise deteriorating. In this regard, the receptacle or set of receptacles on a circuit can be programmed to only allow a certain total current load, which can be set below the code and/or circuit breaker level(s). In this case, the central unit monitors the total current load on a branch and can proactively control the load by switching off loads or reducing power to certain receptacles. The central unit determines which outlets are connected on which circuit legs via power signature analysis. The ordering of what receptacles get switched off or reduced power can be set via policy as to the load type. This policy can be manually adjusted or overridden if desired or can be mandatory. This type of active power management can help make the premises less fire prone. In this regard, it is noted that many home fires are caused by electrical wiring problems. Accordingly, this type of system may be dictated by a code and/or rewarded by insurance providers.

3. Wiring Leg Monitoring

This is done by monitoring the current near the input source via a receptacle near the power input to the house and monitoring the current farther down a circuit branch. The difference in power signatures as recognized by the respective outlets will indicate if the wiring between the outlets is not functioning properly. If this occurs, a number of actions can be taken. For example, a receptacle can be instructed to switch off the panel breaker for the circuit by inducing a short circuit for a period of time, tripping the breaker or switch off for all the receptacles on that branch circuit. If this is not appropriate to open the breaker, an alert can be sent out via the communications pathways described above. Such an alert can be sent out for any life safety condition or other specified condition.

In the illustrated process 500, after the desired policies and rules have been established, loads are monitored (508) to identify load signatures. As discussed above, different devices may have different signatures that can be identified by analyzing the power signal or may communicate an identification code to the controller. In this manner, the device(s) plugged into a given outlet, or the general or specific class of such devices, can be determined. A controller such as a local controller discussed above can develop (510) and update a load map for supportive receptacles on the premises. Thus, at any given time, the local controller may store an estimate as to what devices or classes of devices are plugged in via what receptacles of the premises and how much power they are consuming individually and as a whole. It should be noted in this regard that only a subset of all receptacles on a given premises may be smart receptacles or that only a subset of receptacles (even if all receptacles are smart receptacles) may be participating receptacles with respect to a system implementation or with respect to individual policies.

Moreover, a physical security override mechanism such as, for example, the turnkey security mechanism described in PCT Application No. PCT/US2009/038,472, which claims priority from U.S. Provisional Patent Application Ser. No. 61/039,716, (both of which are incorporated herein by reference), may be employed to allow users "opt out" of some or all of the noted functionality with respect to an outlet, receptacle, or set thereof. Generally, this turnkey security mechanism provides a physical mechanism, such as a key, that allows this functionality to be turned on or off with regard to the outlet(s) at issue. When the functionality is turned off, these outlets may revert to being conventional outlets without network control. The key could be located at the local controller or at the outlet and could be a virtual key (e.g., a password enabled software override feature) or a physical key. In this manner, the user can override policies or other network controls, for example to alleviate security concerns. Optionally, certain functions, such as GFI functionality and/or utility based control for intelligent brownout/blackout events, may be exempted from this turnkey security mechanism override.

During operation of the system, a controller such as a local controller may identify (512) a condition governed by policy. For example, in the case of an external policy such as a change in operating mode dictated by the grid power supplier, the condition may be identified based on receipt of an instruction from the external source. For example, the local controller may receive a message from the electrical utility provider specifying transition to an efficiency mode or a brownout mode. Alternatively, the condition may be identified based on the occurrence of a programmed policy condition. For example, if efficiency mode operation requires that certain receptacles be turned off at certain time periods, the beginning of such a time period may be identified as a condition governed by policy. As a still further alternative, the existence of a condition governed by a policy may be identified based on analysis of load information communicated from a smart receptacle to the local controller. For example, over loading of a circuit, manual operation of a device in contravention of a policy, or other loading based conditions may be identified.

Upon identification of such a condition a controller such as the local controller may access (514) rules for implementing the relevant policy. Thus, if the electrical utility provider specifies a conservation mode of operation, local rules may be consulted to implement the required energy usage reduction in accordance with customer preferences. Similarly, during secure vacation mode operation, if an electrical device is manually operated, the owner or a security or emergency service provider may be contacted according to rules defined by the owner. It can be appreciated that both the local premise and remote grid controller can keep a record of when policies are set and actions that are taken to enforce those policies by the system. These logs may then be used as decision criteria for policies themselves. This enables the system to record and act on various kinds of historical data. In any event, the rules are applied (516) in relation to all supported receptacles or a specified subset thereof so as to give effect to the desired policy. Specifically, instructions may be transmitted (518) to the affected receptacles by the local controller. These instructions may, for example, cause a receptacle to be turned on, to be turned off or to operate in a reduced power usage mode. The smart receptacle then operates to execute (520) the instructions.

In this regard, as noted above, the smart receptacle may include a fast operating switch operable in conjunction with a traditional mechanical relay as discussed above. This switch and associated relay can be operated to turn the receptacle on, to turn it off or to steal cycles from the power signal. In the last regard, the switch can be controlled by analog or digital devices to execute such switching at or near a zero current flow point of the power signal so as to reduce the potential for arcing. Moreover, such a switch is preferably designed to function within the heat budget of the application environment. In this regard, it is noted that receptacle boxes may, in some cases, be surrounded by insulation such that heat dissipation is largely limited to heat transfer across the face plate. The present invention can be implemented within the associated heat budget. However, if necessary, face plate structures can be modified to provide a larger heat budget for operation of the system. For example, the associated electrical boxes can extend some distance from the wall so as to provide greater heat transfer surfaces or active heat dissipation, e.g., by miniature fans, can be employed.

Another application where it may be desired to control electrical devices in accordance with a policy or to allow for remote control of such appliances is the data center environment. In this regard, it is often useful to be able to control power to electronic data processing equipment. This capability is especially useful for situations where the equipment is densely packed as in a data center that is far away from the user who desires to control the equipment.

Figure 6:
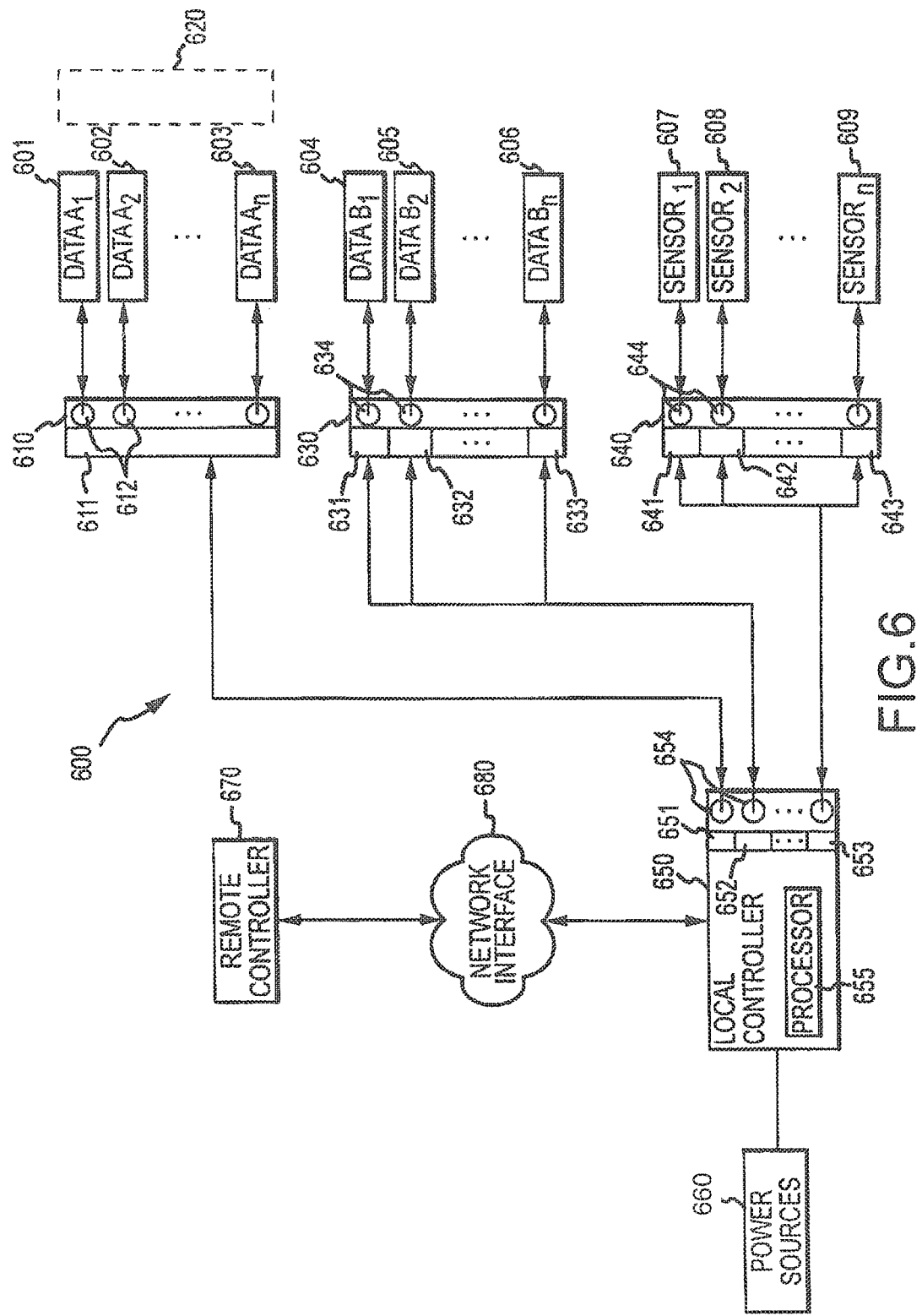
FIG. 6 illustrates a smart outlet system in accordance with the present invention implemented in a data center context in accordance with the present invention.

FIG. 6 illustrates a system 600 for enabling such control in a data center environment. In particular, the illustrated system 600 includes a number of data center devices 601-609. These devices 601-609 include a number of data devices 601-606 such as servers, storage devices and the like. In addition, the devices 601-609 include a number of sensors 607-609 such as temperature sensors, humidity sensors, cage or cabinet door lock sensors and the like. The devices 601-609 are typically mounted in one or more two- or four-post equipment racks data center racks.

In the illustrated embodiment, the devices 601-609 are plugged into receptacles 612, 634 and 644 associated with a number of power strips 610, 630 and 640. As will be discussed in more detail below, these receptacles 612, 634 and 644 may be smart receptacles as generally described above.

The power strips 610, 630 and 640 are connected by power lines to a local controller 650. In this case, the local controller 650 may be built into a data center power distribution unit such as marketed by Zonit Structured Solutions. Generally, the power distribution unit includes a number of output ports 654 for outputting power from power sources 660 to the power strips 610, 630 and 640. The power distribution unit may be associated with multiple power sources 660 such as an A source and a B source so as to provide redundant, fail-safe power to critical equipment. In this regard, different ones of the output ports 654 may be associated with different ones of the power sources. Moreover, certain equipment may have connections to multiple power strips, as generally indicated in phantom by redundant power strips 620, so as to provide fail-safe operation. In this regard, such critical equipment may be equipped with multiple power cords or an appropriate cord assembly with a fast-switching unit may be provided as described in U.S. Provisional Patent Application Ser. No. 60/894,842, and U.S. Patent Application Serial No. PCT/US2008/057140, which claims priority therefrom, which are incorporated herein by reference.

The illustrated system 600 includes a number of elements for enabling remote and/or policy based operation of the devices 601-609. Specifically, the local controller 650 includes a processor 655 such as a single board computer for executing local controller functionality as described above. In particular, the processor 655 enables wired or wireless communication between the local controller 650 and a remote controller 670 via a network interface 680. The processor 655 also enables communication between the local controller 650 and the smart receptacles 612, 634 and 644. Such communications between the local controller 650 and remote controller 670 may be conducted via the internet using a standard internet protocol involving TCP/IP protocol and utilizing TCP/IP and UDP packets. Communications between the local controller 650 and the receptacles 612, 634 and 644 are also preferably conducted in accordance with a TCP/IP protocol and may be adapted for the local environment. In this regard, the communications between the local controller 650 and the receptacles 612, 634 and 644 may be conducted via the power lines, wirelessly in accordance with an IEEE 802.11 protocol or in any other appropriate fashion. It will be appreciated that customized messaging may be provided in this regard to accomplish the purposes of the system 600. Accordingly, the processor 655 can function as a protocol gateway to translate between the protocol for communications between the remote controller 670 and the local controller 650 and the protocol used for internal messaging between the local controller 650 and the receptacles 612, 634 and 644. Devices can be plugged into the smart receptacles and use the controller as a gateway to the data center LAN (instead of or in addition to the WAN).

In the illustrated implementation, communications between the local controller 650 and the receptacles 612, 634 and 644 are conducted via the power lines therebetween. This is advantageous in that dedicated communications lines are not required as is problematic in a data center environment due to the complexity of additional wiring and potential interference with cooling airflows. In this regard, each of the output ports 654 of the local controller 650 may be associated with a power wire communications interface 651-653. These interfaces 651-653 are operative to induce messaging signals in the power lines as well as to remove incoming messaging signals from the power lines so as to provide effective electrical isolation of the different communication pathways. Similar power line messaging interfaces 611, 631-633 and 641-643 are provided in connection with the power strips 610, 630 and 640 for the same reasons.

Each individual receptacle of a power strip may be controlled independently or all receptacles of a power strip may be controlled as a group in accordance with the present invention. Thus, in the illustrated system 600, all of the receptacles 612 of the strip 610 are associated with a single communications interface 611. Similarly, all of the receptacles 612 of the strip 610 may be associated with a common logical element for monitoring electrical signatures or receiving messages from the devices 601-603.

By contrast, each receptacle 634 and 644 of the power strips 630 and 640 is associated with its own independent communications interface 631-633 and 641-643 in the illustrated embodiment. For example, each receptacle 634 and 644 may have dedicated wiring or the signals transmitted through the power wiring may be multiplexed with respect to the individual receptacles (e.g., time division multiplexed, frequency division multiplexed, code-division multiplexed, etc.). In this manner, the devices 604-609 associated with the receptacles 634 and 644 can be individually controlled, and the devices 604-609 can independently message the local controller 650 and intern, in turn, the remote controller 670. In the latter regard, it will be appreciated that it may be desired to provide messaging to the remote controller 670 based on output from the sensors 607-609.

Figure 8:
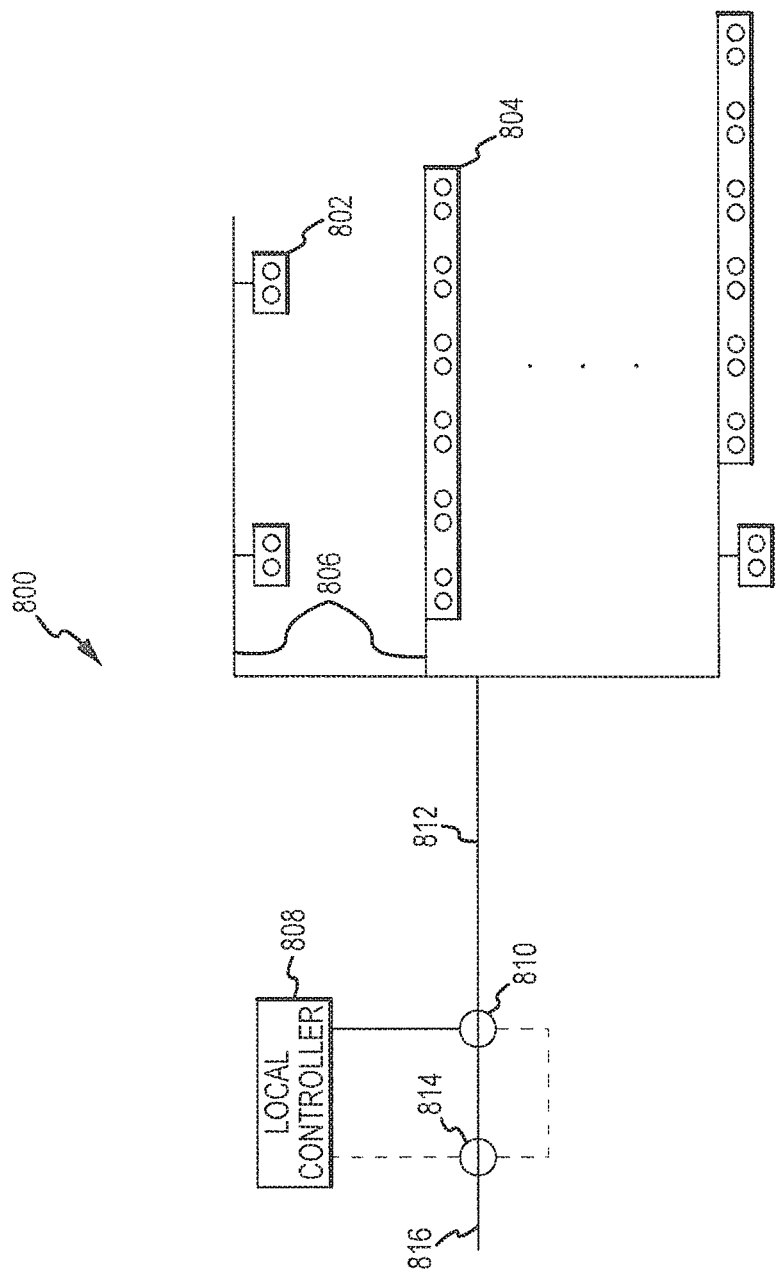
FIG. 8 is a schematic diagram of a controlled set of receptacles showing how signals are inserted into power lines and prevented from being transmitted to external power lines.

Alternatively, a single transceiver for each power source (e.g., A and B sources) may be utilized to induce signals in the associated wiring and a single signal canceller or attenuator, as discussed above, may be utilized to substantially prevent transmission of communications to external power lines. This is generally shown in FIG. 8. In particular, FIG. 8 shows a control system 800 for a set of receptacles defining a controlled domain. The receptacles may include a number of receptacle outlets 802 (typical for home or business environments) and/or a number of plug strips 805 or adaptors (typical for data center environments) that may be arranged in one or more branch circuits 806.

The receptacles are controlled by a local controller 808, which may be, for example, embodied in a personal computer (typical for home or business applications) or in a single board computer incorporated into a power distribution unit in a data center. The local controller uses a transceiver 810 to insert signals into the main 812 and branch circuits 806 for communication to the receptacles and to receive signals from the receptacles. A signal isolation device 814, which may be a signal canceller or a signal attenuator as described above, substantially prevents transmission of these signals to external (outside of the controlled domain) power lines 816. This structure may be replicated for A and B power sources in a data center. It will be appreciated that thus disposing all of the controlled receptacles on a single waveguide (or two waveguides in the case of a data center with A and B power sources) is a cost effective implementation. Communications with separate receptacles can be distinguished by use of an appropriate addressing scheme.

Figure 7:
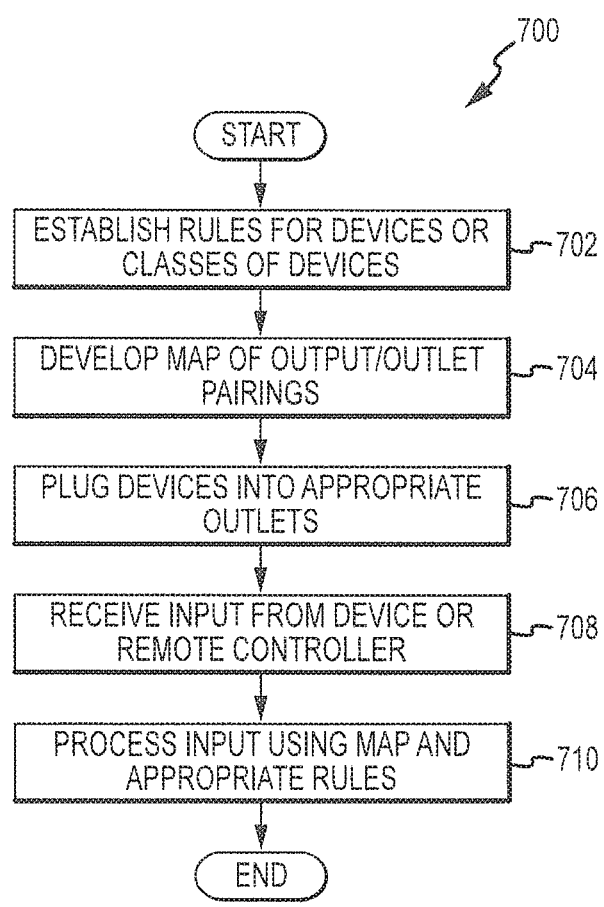
FIG. 7 is a flow chart illustrating a process for controlling devices in a data center context in accordance with the present invention.

FIG. 7 illustrates a process 700 that may be implemented in connection with operation of the present invention in the data center context. The process 700 is initiated by establishing (702) rules for devices or classes of devices. For example, these rules may define preferences for powering up or powering down devices, establish groups of devices to be controlled collectively, determine who may access devices and at what times, etc. The process 700 further involves developing (704) a map of output/outlet pairings. In this regard, it is possible to identify devices or classes of devices based on a signature analysis as described above. Alternatively, a data center user may define what devices are connected to what receptacles of what power strips and what power strips are attached to what outlet ports of the power distribution units. For example, in this manner, the user can define groups of devices that will be operated collectively (e.g., by plugging the devices into a power strip that is operated as a unit) and can specify critical devices for fail-safe operation. Such operation can then be executed simply by plugging the devices into the correct outlets of the correct power strips and plugging the power strips into the correct output ports of the power distribution unit. Execution of this power structuring may be facilitated by way of appropriate indicators, such as LEDs or small display units provided on the power strips and/or the power distribution unit. In this manner, the devices can be easily plugged (706) into appropriate outlets.

The power strips or the individual receptacles then receive (708) an input from the device or the local or remote controller. For example, an operator of a remote controller unit may choose to power down or power up a device or set of devices. An appropriate message is transmitted from the remote controller to the local controller, and this is in turn communicated from the local controller to the power strip or receptacle via the power wiring as discussed above. Alternatively, a signal, such as a power signal for signature analysis or a sensor output signal, may be received at the receptacle from one of the devices and communicated to the local controller (and, if appropriate, to the remote controller). Any such input is then processed (710) using the noted map and appropriate rules. Thus, for example, an instruction from a remote controller to power down certain devices can be executed by consulting the map to identify the outlets associated with the appropriate devices and then communicating a power down signal to those receptacles. Similarly, a signal from a device such as a sensor may be interpreted by consulting the map to determine what sensor transmitted the signal and then accessing and applying the appropriate rules for processing the signal.

In addition, the current interrupting ability of the receptacle described above permits using a transformer for sensing unbalanced current in the load and interrupting the power delivery to the load in certain conditions. This feature is generally similar to common ground fault circuit interruption (GFCI) devices. It differs in that it utilizes the general purpose disconnect relay for the actual disconnection means in the event an unbalanced current condition exists. It also differs in that the detection and decision to disconnect is not performed in the same way as a traditional GFCI, in that the microprocessor control used for the signature detection also has the ability to analyze the current sense data from the dual purpose transformer and in doing so can filter out unwanted or alias current transients. This can result in fewer GFCI interruptions on events not actually attributable to real ground fault events. This condition in general-purpose GFCI circuits is generally annoying and has resulted in the less than enthusiastic reception of GFCI receptacles. Because the Smart Receptacle already has the processor embedded, much better resolution on decision-making can be achieved, and thus fewer false interruptions initiated.

Figure 9:
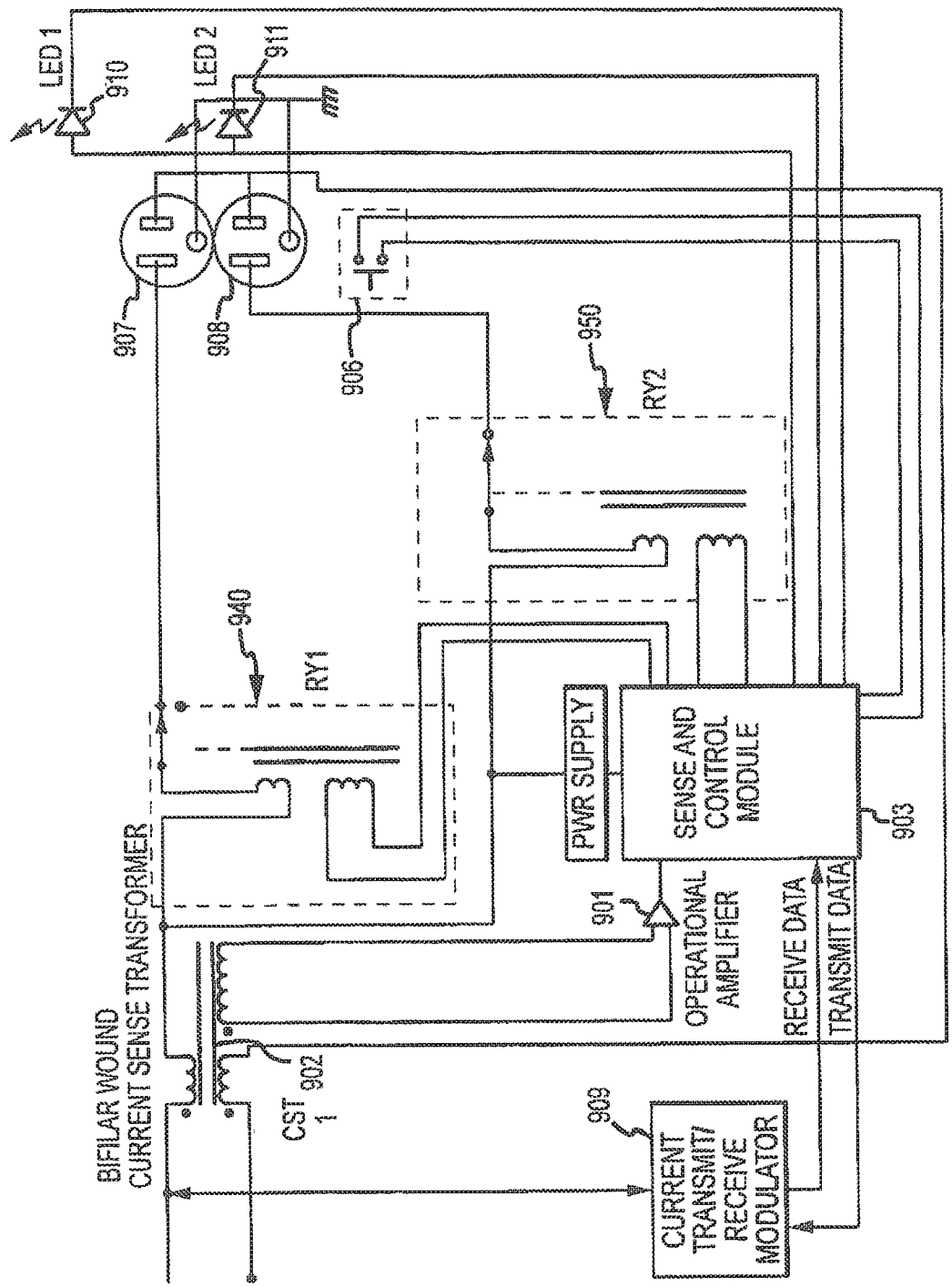
FIG. 9 is a schematic diagram showing GFCI circuitry in accordance with the present invention.

Referring to FIG. 9, a dual-purpose wound transformer 902 is added in the current path, similar to traditional GFCI, and the sensed current "differential" is amplified by the high gain differential amplifier 901. The signal is presented to the Sense and Control Module 903 where an analog to digital (A to D) converter converts the incoming analog signal to a digital signal. The data is processed on an interrupt basis in the microprocessor. If any data appears at the output of the ladder A to D, the processor stops what it is doing and begins analysis of the incoming data stream from the GFCI sense transformer. At this point signature analysis algorithms similar to the algorithms used for general current load analysis are applied to the incoming data. If an event is deemed to be a probable GFCI triggering event, the power control relays 940, 950 are energized, thus in turn disconnecting the AC power source from each of the load receptacles 907, 908. Since the current sense is in the primary power path, both relays must be energized. The event is recorded temporarily in the sense and control module 903 and sent to the Central Command Processor via the current transmitter 909. The event data is also forwarded to the central command processor for additional analysis. The Central Command Processor can determine if the event data was false or true and act accordingly, or it can wait for user intervention and submit a reset. At any time, either the Central Command Processor, or a local user can reset the GFCI interruption condition. This can be accomplished by either receiving a command from the Central Command Processor via the Current Receive Modulator 909 or from a manual reset button on the receptacle 906 by direct user intervention.

Power can be momentarily restored to one receptacle at a time. If the GFCI event still exists, a determination can be made which receptacle is responsible at this time, and the associated LED 910 or 911 can be illuminated and/or flashed.

In addition, the incorporation of Light Emitting Diodes (LEDs) 910, 911 allows other useful functions to be included in the Zonit Smart Receptacle. These LEDS 910, 911 can be controlled from the Central Command Processor. The user interface there can initiate several functions using the LEDs 910, 911 located adjacent to each of the receptacles 907, 908. Some of the functions include, but are not limited to:
  Indication of Ground Fault condition
  Indication of Over Current condition
  Indication of location of the circuit
  Indication of all receptacles on a given circuit branch
  Night Light The LEDs 910, 911 are connected to the Sense and Control Module 903. It receives information either locally from the current sense coils in the relays 940, 950 from the Current Sense Transformer 902, the local manual reset button 906, or from the Central Command Processor via the Current Receive Modulator 909. The various information associated with the LED functions is analyzed by the Sense and Control module and the appropriate LED 910 and 911 is illuminated or extinguished as needed. The LEDs 910, 911 are high illumination types, as much as 1 watt each. For general purpose annunciation needs, the Sense and control Module 903 can pulse width modulate the power to the LEDS 910, 911 to provide a low level output of light, for example, an "indicator light" level of output. For Night Light operation, a higher level of output can be initiated, as much as a continuous on state (no modulation). The LEDs can also be modulated in a visible pattern to indicate information to the end user.

Figure 10:
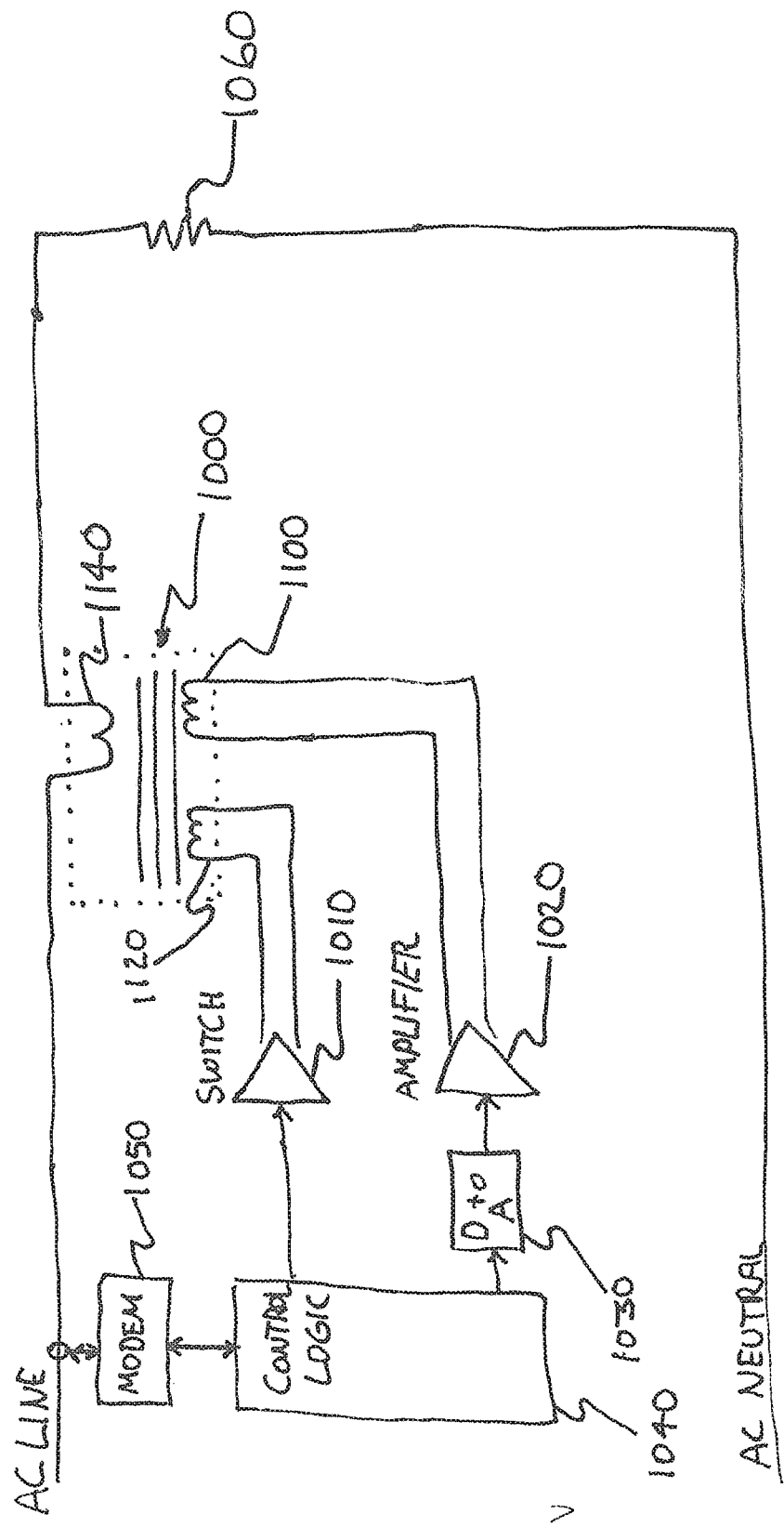
FIG. 10 is a schematic diagram showing a alternate means of implementing a "cycle stealing" switch in accordance with the present invention.

FIG. 10 illustrates a possible method of electronically providing the single cycle "stealing" function mentioned earlier. Instead of a conventional power switch, e.g. relay or triac or other semiconductor device, the principal described here allows the AC power to be shut off from the load 1060 by induction rather than switching. The means by which this works is via a saturable iron reactor, or inductor (1000). A combination of two effects is utilized to achieve the removal of each half cycle or multiples thereof. The first effect is that of a large inductor in series with the AC power delivery to the load 1060. If this inductor, or reactor as it is referred to in this context, is acting as a pure inductor, the AC to the load 1060 will be restricted by the reactance of the inductor winding 1140. If the inductor core is saturated by a DC bias to a second winding 1120 via a switch 1010, the core will no longer operate as an inductor, but will appear more as a low impedance short, thus allowing nearly all of the applied AC voltage to pass through the switch winding 1140 and to the load 1060. This would be the normal condition of the inductor switch.

When a command to steal a half cycle is received via the modem 1050 and is prepared by the control logic 1040, the control logic sends a gating signal to the switch 1010 which in turn removes power from the core saturation winding 1120. This allows the field in the core to be counteracted by the potential rising of a magnetic field in the switch winding 1040, and throughout the half cycle of the AC, the switch winding 1040 appears as an inductor, thus applying a significant reduction of the current delivered to the load 1060. To further aid the negation of the power delivery to the load 1060, the control logic 1040 sends a programmed set of values to the D to A 1030, which in turn generates a bias analog signal that is amplified by amplifier 1020. This amplified signal is introduced into the third winding 1100 of the saturable iron reactor 1000. This signal drives the magnetization of the core in the opposite direction of the naturally occurring magnetization of the switch winding 1140, and in effect cancels out the potential for current flow in the switch winding 1140.

At the completion of the half cycle, the control logic 1040 returns the power to the DC bias winding 1120, thus saturating the core, and removes the bias signal from the bias winding 1100. At this state, the switch winding is now back on with very little inductance and supplying full current to the load. This state will remain until the control logic 1040 determines it is appropriate to "steal" another half cycle.

It should be appreciated that the inventors are aware of the size and weight of using conventional reactor technology to restrict the desired frequency and currents associated with the intent of this invention. It should also be appreciated, that by applying the dual mode control, and use of modern materials, it may be possible to reduce the size and weight to an acceptable level.

In the forgoing description, certain functionality is reference either in relation to a data center or a home/office environment. It should be appreciated that the functionality described for the data center monitoring and control is directly applicable to the home and office power distribution model, and vice-versa. Moreover, these examples are not intended to limit the invention to any particular environment.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A method for use in monitoring electrical power usage within a premises, comprising:
   providing a system controller for storing device-specific instructions, for a number of electrical devices, accessible based on device data comprising at least one of an identity, a type, and a state of each respective electrical device, said device-specific instructions governing monitoring functions for said number of electrical devices;
   monitoring a premises electrical network comprising one or more electrical circuits of the premises to obtain first device data for a first electrical device connected to said premises electrical network, said first device data comprising at least one of an identity, a type, and a state of said first electrical device;
   obtaining power signal information, associated with the operation of each of said number of electrical devices, reflecting one or more effects on a power signal associated with said operation of each of said number of electrical devices and processing said power signal information to obtain electrical signature information for each of said number of electrical devices, wherein said system controller is operative to obtain said first device data by comparing a first signature of said of first electrical device to said electrical signature information;
   first operating said system controller to use said first device data to access said stored device-specific instructions so as to obtain a set of one or more first device-specific instructions for said identified first electrical device, and generate an output signal based on said first device-specific instructions; and
   second operating a premises monitoring device to receive said output signal and execute a first monitoring function in accordance with said first device-specific instructions.

2. The method as set forth in claim 1, wherein said effects comprise time-dependent characteristics of said power signal associated with operation of said electrical devices, and said step of obtaining comprises sensing said power signal during operation of said electrical devices, alone or in combination.

3. The method as set forth in claim 1, wherein said processing comprises using heuristic logic to learn said signatures based on said power signal information.

4. The method as set forth in claim 1, wherein said monitoring comprises determining a type of device associated with said first power signal information.

5. The method as set forth in claim 1, wherein said processing comprises identifying effects on said power signal associated with concurrent operation of two or more electrical devices.

6. The method as set forth in claim 1, wherein said operating comprises determining state information regarding one of a state and a change of state said first electrical device.

7. The method as set forth in claim 6, wherein said state information concerns one of an on state, an off state, an idle state, and active state and a status of a defined operation of said first electrical device.

8. The method as set forth in claim 1, further comprising identifying a potentially hazardous condition based on said power signal information.

9. The method as set forth in claim 1, further comprising identifying a potential malfunction of said first electrical device based on said power signal information.

10. The method as set forth in claim 1, further comprising identifying a power usage outside of a defined range based on said power signal information.

11. The method as set forth in claim 1, further comprising identifying a deviation from a known power usage pattern based on said power signal information.

12. The method as set forth in claim 1, wherein said first device-specific instructions define alert conditions for said first electrical device and said controlling comprises generating an alert for transmission to a user.

13. The method as set forth in claim 12, wherein said alert is provided to said user via an electronic message.

14. The method as set forth in claim 12, wherein said alert is provided to a home security system.

15. The method as set forth in claim 1, wherein said operating comprises employing a network interface for communicating with a component for automating control of said first electrical device.

16. The method as set forth in claim 1, wherein said monitoring is executed at least in part at a circuit breaker panel of said premises.

17. The method as set forth in claim 1, wherein said monitoring is executed at least in part at a power outlet of said premises.

18. The method as set forth in claim 1, wherein said operating comprises controlling delivery of power to said first electrical device.

19. An apparatus for use in monitoring electrical power usage within a premises, comprising:
   a system controller for storing device-specific instructions, for a number of electrical devices, accessible based on device data comprising at least one of an identity, a type, and a state of a respective electrical device, said device-specific instructions governing monitoring functions for said number of electrical devices; and
   a sensor system for monitoring a premises electrical network comprising one or more electrical circuits of the premises;

said system controller being operative to receive an output from said sensor system and to obtain first device data for a first electrical device connected to said premises electrical network, said first device data comprising at least one of an identity, a type, and a state of said first electrical device;

said system controller further being operative for obtaining power signal information, associated with the operation of each of a number of electrical devices, reflecting one or more effects on a power signal associated with said operation of each of said number of electrical devices and processing said power signal information to obtain electrical signature information for each of said number of electrical devices, and said system controller obtains said first device data by comparing a first signature of said of first electrical device to said electrical signature information;

said system controller further being operative to use said first device data to access said stored device-specific instructions so as to obtain a set of one or more first device-specific instructions for said identified first electrical device, and generate an output signal based on said first device-specific instructions; and a premises monitoring device for receiving said output signal and executing a first monitoring function in accordance with said first device-specific instructions.

20. The apparatus as set forth in claim 19, wherein said effects comprise time-dependent characteristics of said power signal associated with operation of said electrical devices, and said power signal information is obtained by sensing said power signal during operation of said electrical devices, alone or in combination.

21. The apparatus as set forth in claim 19, wherein said system controller comprises a heuristic logic module for using heuristic logic to learn said signatures based on said power signal information.

22. The apparatus as set forth in claim 19, wherein said system controller is operative for determining a type of device associated with said first power signal information.

23. The apparatus as set forth in claim 19, wherein said system controller is operative for identifying effects on said power signal associated with concurrent operation of two or more electrical devices.

24. The apparatus as set forth in claim 19, wherein said system controller is operative for determining state information regarding one of a state and a change of state said first electrical device.

25. The apparatus as set forth in claim 24, wherein said state information concerns one of an on state, an off state, an idle state, and active state and a status of a defined operation of said first electrical device.

26. The apparatus as set forth in claim 19, wherein said system controller is operative for identifying a potentially hazardous condition based on said power signal information.

27. The apparatus as set forth in claim 19, wherein said system controller is operative for identifying a potential malfunction of said first electrical device based on said power signal information.

28. The apparatus as set forth in claim 19, wherein said system controller is operative for identifying a power usage outside of a defined range based on said power signal information.

29. The apparatus as set forth in claim 19, wherein said system controller is operative for identifying a deviation from a known power usage pattern based on said power signal information.

30. The apparatus as set forth in claim 19, wherein said first device-specific instructions define alert conditions for said first electrical device and said controlling comprises generating an alert for transmission to a user.

31. The apparatus as set forth in claim 30, wherein said alert is provided to said user via an electronic message.

32. The apparatus as set forth in claim 30, wherein said alert is provided to a home security system.

33. The apparatus as set forth in claim 19, wherein said output signal is generated by employing a network interface for communicating with said premises monitoring device and said premises monitoring device is operative for automating control of said first electrical device.

34. The apparatus as set forth in claim 19, wherein said sensor system is disposed at least in part at a circuit breaker panel of said premises.

35. The apparatus as set forth in claim 19, wherein said sensor system is disposed at least in part at a power outlet of said premises.

36. The apparatus as set forth in claim 19, wherein said premises monitoring device is operative for controlling delivery of power to said first electrical device.

* * * * *